(12) United States Patent
Sasanuma et al.

(10) Patent No.: US 7,712,363 B2
(45) Date of Patent: May 11, 2010

(54) LIQUID STATE DETECTING SENSOR

(75) Inventors: Takeo Sasanuma, Komaki (JP); Yoshikuni Sato, Nagoya (JP); Takashi Yamamoto, Niwa-gun (JP)

(73) Assignee: NGK Spark Plug Co., Ltd., Aichi (JP)

( * ) Notice: Subject to any disclaimer, the term of this patent is extended or adjusted under 35 U.S.C. 154(b) by 312 days.

(21) Appl. No.: 11/994,191

(22) PCT Filed: Jun. 30, 2006

(86) PCT No.: PCT/JP2006/313139

§ 371 (c)(1),
(2), (4) Date: Dec. 28, 2007

(87) PCT Pub. No.: WO2007/004583

PCT Pub. Date: Jan. 11, 2007

(65) Prior Publication Data

US 2009/0090178 A1 Apr. 9, 2009

(30) Foreign Application Priority Data

Jul. 1, 2005 (JP) ............................. 2005-193298

(51) Int. Cl.
*G01F 23/00* (2006.01)
(52) U.S. Cl. ....................................................... 73/295
(58) Field of Classification Search .................... 73/295
See application file for complete search history.

(56) References Cited

U.S. PATENT DOCUMENTS

| 4,924,702 | A |   | 5/1990 | Park |
| 5,551,283 | A | * | 9/1996 | Manaka et al. ............. 73/31.01 |
| 6,250,152 | B1 |  | 6/2001 | Klein et al. |

(Continued)

FOREIGN PATENT DOCUMENTS

JP 9-152368 A 6/1997

(Continued)

*Primary Examiner*—Hezron Williams
*Assistant Examiner*—Rodney T Frank
(74) *Attorney, Agent, or Firm*—Sughrue Mion, PLLC

(57) ABSTRACT

A liquid state detecting sensor is provided in which a level detecting unit for detecting the level of a liquid and a concentration detecting unit for detecting the concentration of a particular component contained in the liquid are integrated.

In a liquid state detecting sensor 100 capable of measuring the level and a urea concentration of a urea aqueous solution, a level detecting unit 70 and a liquid property detecting unit 30 are connected in an insulated state. An outer cylinder electrode 10 and an inner electrode 20 for forming the level detecting unit 70 form a capacitor, and level detection is performed on the basis of the electrostatic capacity which changes in response to the level of the urea aqueous solution which is present therebetween. A holder 120 for holding a ceramic heater 110 is fitted to a leading end portion 21 of the inner electrode 20, and the holder 120 is supported inside a leading end portion 11 of the outer cylinder electrode 10 by a rubber bushing 80. Further, the urea concentration is determined by a liquid property detecting circuit unit of a circuit board 60 by energizing a heat generating resistor pattern provided on the ceramic heater 110 for a fixed time duration and on the basis of a voltage value corresponding to a resistance value of the heat generating resistor pattern obtained at this time.

18 Claims, 13 Drawing Sheets

U.S. PATENT DOCUMENTS

2005/0011183 A1  1/2005  Ripper et al.

FOREIGN PATENT DOCUMENTS

| | | | |
|---|---|---|---|
| JP | 11-507434 | A | 6/1999 |
| JP | 2001-524682 | A | 12/2001 |
| JP | 2002-371831 | A | 12/2002 |
| JP | 2004-517336 | A | 6/2004 |
| JP | 2005-84026 | A | 3/2005 |
| WO | 99/28149 | A1 | 6/1999 |

* cited by examiner

LIQUID STATE DETECTING SENSOR

TECHNICAL FIELD

The present invention relates to a liquid state detecting sensor for detecting the level of a liquid accommodated in a liquid accommodating container and at least the concentration of a particular component contained in the liquid.

BACKGROUND ART

Conventionally, a level sensor for detecting, for instance, the level (liquid level) of a liquid is known as an example of a sensor for detecting the state of a liquid, an electrostatic capacity-type liquid meter as its example is used in the measurement of the residual quantity of fuel in an automobile, for example (e.g., refer to patent document 1). In this electrostatic capacity-type liquid meter, a capacitor is formed between an elongated tubular electrode (outer cylinder electrode) made of a conductor and a tubular electrode (inner electrode) provided within that tube along the axial direction (hereafter referred to as the "gap") so as to measure its electrostatic capacity. The electrostatic capacity-type liquid meter is mounted in a tank for accommodating the liquid such that the axial direction of the outer cylinder electrode becomes the rising and falling direction of the level of the liquid. Since the electrostatic capacity of a portion which is not immersed in the liquid is dependent upon the dielectric constant of air in the gap, and the electrostatic capacity of a portion which is immersed in the liquid is dependent upon the dielectric constant of, the measured electrostatic capacity becomes larger as the level of the liquid becomes higher. For this reason, it is possible to detect the level of the liquid on the basis of the electrostatic capacity.

In recent years, there are cases where an NOx selective reduction catalyst (SCR) is used for an exhaust gas purifying apparatus for reducing into harmless gas nitrogen oxides (NOx) emitted from, for example, a diesel powered automobile, and a urea aqueous solution is used as its reductant. In the case of measuring the level of a liquid which exhibits electrical conductivity as in the case of this urea aqueous solution, a level sensor is used in which an insulating film made of a dielectric is coated on the outer surface of the inner electrode, for the purpose of preventing short-circuiting between the outer cylinder electrode and the inner electrode of the aforementioned level sensor. The electrostatic capacity of a portion which is not immersed in the liquid becomes a combined capacity of the electrostatic capacity of an air layer in the gap and the electrostatic capacity of the insulating film of the inner electrode. Meanwhile, since the electrostatic capacity of a portion which is immersed in the liquid becomes the electrostatic capacity of the insulating film since the electrically conductive liquid assumes a potential substantially equivalent to that of the outer cylinder electrode. Then, the total of the two electrostatic capacities is measured as the overall electrostatic capacity of the sensor. Since the thickness of the insulating film is sufficiently small as compared to the thickness of the air layer, the amount of change of the electrostatic capacity accompanying a decrease of the portion which is not immersed in the liquid is sufficiently small as compared with the amount of change of the electrostatic capacity accompanying an increase of the immersed portion. For this reason, the overall electrostatic capacity of the sensor becomes directly proportional to the increase and decrease of the electrostatic capacity of the portion immersed in the liquid, so that it is possible to detect the level from the relative magnitude of the measured electrostatic capacity.

If such a level sensor is used by being assembled to a UUU, it is possible to issue a warning or the like in the case where the residual quantity of the urea aqueous solution is small, making it possible to inform the driver that it has become impossible to properly perform the reduction of nitrogen oxides by the exhaust gas purifying apparatus. Incidentally, it is known that the urea aqueous solution has a proper range of concentration (concentration of urea contained in the solution) in effectively reducing the nitrogen oxides. For this reason, even if the residual quantity of the urea aqueous solution is a proper quantity, there is a possibility that the reduction of the nitrogen oxides cannot be effected satisfactorily in cases where the concentration of the urea aqueous solution has deviated from a proper range due to such as a change over time and in cases where a liquid (light oil, water) other than the proper urea aqueous solution is accommodated in a urea water tank. Accordingly, it has been proposed to juxtapose a concentration sensor for detecting the concentration of the urea aqueous solution in the urea water tank and to issue a warning or the like in response to the respective outputs of the level sensor and the concentration sensor (e.g., refer to patent document 2). It should be noted that, as such a concentration, one has been proposed which is used in a indirectly heated-type concentration detecting unit including a heat generating resistor and a temperature sensing element (e.g., refer to patent document 3).

Patent document 1: JP-A-9-152368

Patent document 2: JP-A-2002-371831

Patent document 3: JP-A-2005-84026

DISCLOSURE OF THE INVENTION

Problems to be Solved by the Invention

However, in the case where the level sensor and the concentration sensor are provided as separate units in the urea water tank, there have been problems in that there arises the need to provide respective mounting positions in the urea water tank, and that the quantity of urea aqueous solution accommodated cannot be increased unless the size of the urea water tank is enlarged due to the effect of the volume occupied by the both sensors. In addition, in the case where the level sensor and the concentration with relatively large volumes, shown in the patent documents 1 and 3, are mounted as separate units in the urea water tank, there has been a problem in that since the heat capacities of the sensors occupying the interior of the urea water tank become disadvantageously large, it takes time until defreezing when the urea aqueous solution is frozen, making it impossible to speedily effect the detection of the state of the liquid.

The invention has been devised to overcome the above-described problems, and its object is to provide a liquid state detecting sensor in which a level detecting unit for detecting the level of a liquid and a concentration detecting unit for detecting at least the concentration of a particular component contained in the liquid are connected as an integral unit.

Means for Overcoming the Problems

To attain the above object, the liquid state detecting sensor of the invention according to claim 1 is characterized by being a liquid state detecting sensor for detecting the state of a liquid accommodated in an accommodating container, comprising: a level detecting unit having a first electrode and a second electrode extending in a longitudinal direction and configured to form a capacitor whose electrostatic capacity changes between the first electrode and the second electrode in correspondence with a level of the liquid accommodated in the accommodating container; a mounting part located on a rear end side in the longitudinal direction of the level detecting unit and adapted to mount the liquid state detecting sensor in the accommodating container; a liquid property detecting element connected to the level detecting unit in an insulated state and adapted to detect at least a concentration of a particular component contained in the liquid, the liquid property detecting element having its leading end located closer to a leading end of the liquid state detecting sensor than a longitudinal leading end of the level detecting unit and having a heat generating resistor pattern whose resistance value changes in correspondence with a temperature of the heat generating resistor pattern, the heat generating resistor pattern being located closer to the leading end of the liquid state detecting sensor than the longitudinal leading end of the level detecting unit; and a detection circuit for detecting a concentration of the particular component contained in the liquid on the basis of a change of an electric property of the heat generating resistor pattern.

In addition, the liquid state detecting sensor of the invention according to claim 2 is characterized, in addition to the configuration according to claim 1, in that the liquid is an electrically conductive liquid, and the liquid property detecting element has a configuration in which the heat generating resistor pattern is embedded in an insulating ceramic substrate, wherein an outer surface of the insulating ceramic substrate at a portion where the heat generating resistor pattern is disposed comes into contact with the liquid.

In addition, the liquid state detecting sensor of the invention according to claim 3 is characterized, in addition to the configuration according to claim 1 or 2, in that the detection circuit energizes the heat generating resistor pattern for a fixed time duration, obtains a first corresponding value and a second corresponding value corresponding to resistance values of the heat generating resistor pattern at different timings within the fixed time duration, and detects the concentration of the particular component in the liquid on the basis of the first corresponding value and the second corresponding value.

In addition, the liquid state detecting sensor of the invention according to claim 4 is characterized, in addition to the configuration according to any one of claims 1 to 3, in that the first electrode is a tubular outer cylinder electrode formed of a conductor, and the second electrode is an inner electrode formed of a conductor and provided within the outer cylinder electrode along the longitudinal direction thereof.

In addition, the liquid state detecting sensor of the invention according to claim 5 is characterized, in addition to the configuration according to claim 4, in that the inner electrode has a tubular shape, and a lead wire which is electrically connected to the liquid property detecting element is inserted in an inside of the inner electrode.

In addition, the liquid state detecting sensor of the invention according to claim 6 is characterized, in addition to the configuration according to claim 4 or 5, in that the liquid property detecting element is held by an insulating holder which is fitted to a leading end portion of the inner electrode.

In addition, the liquid state detecting sensor of the invention according to claim 7 is characterized, in addition to the configuration according to claim 6, in that the liquid is an electrically conductive liquid, and the holder is fitted on an outer side of the leading end portion of the inner electrode by means of a seal ring, and an insulating film is formed on a surface of the inner electrode in a range extending at least from a position where the seal ring is disposed on the inner electrode to an outer side of a rear end portion of the inner electrode.

In addition, the liquid state detecting sensor of the invention according to claim 8 is characterized, in addition to the configuration according to claim 6, in that the liquid is an electrically conductive liquid, the inner electrode has a tubular shape, the holder is fitted on an inner side of the leading end portion of the inner electrode by means of a seal ring, and an insulating film is formed on a surface of the inner electrode in a range extending at least from a position where the seal ring is disposed on the inner electrode to an outer side of a rear end portion of the inner electrode.

In addition, the liquid state detecting sensor of the invention according to claim 9 is characterized, in addition to the configuration according to any one of claims 4 to 8, in that one or a plurality of slits are formed on at least one generating line of an outer peripheral surface of the outer cylinder electrode.

In addition, the liquid state detecting sensor of the invention according to claim 10 is characterized, in addition to the configuration according to claims 4 to 9, by further comprising: a rubber-made supporting member interposed between an outer side of the inner electrode and an inner side of the outer cylinder electrode, wherein the inner electrode is resiliently supported on the inner side of the outer cylinder electrode by the supporting member.

In addition, the liquid state detecting sensor of the invention according to claim 11 is characterized, in addition to the configuration according to claim 10, in that the liquid property detecting element is held by the insulating holder fitted to the leading end portion of the inner electrode, and the supporting member supports the holder so as not to move toward the leading end side.

In addition, the liquid state detecting sensor of the invention according to claim 12 is characterized, in addition to the configuration according to claim 10 or 11, in that a circulation passage for allowing the liquid which is present on a leading end side of the supporting member and the liquid which is present on a rear end side of the supporting member to circulate is formed on the supporting member.

In addition, the liquid state detecting sensor of the invention according to claim 13 is characterized, in addition to the configuration according to claim 12, in that the circulation passage is provided by grooving an outer lateral surface of the supporting member.

In addition, the liquid state detecting sensor of the invention according to claim 14 is characterized, in addition to the configuration according to claim 12 or 13, in that the circulation passage is provided by grooving an inner lateral surface of the supporting member.

In addition, the liquid state detecting sensor of the invention according to claim 15 is characterized, in addition to the configuration according to any one of claims 4 to 14, in that a leading end portion of the outer cylinder electrode surrounds the liquid property detecting element peripherally in the radial direction.

In addition, the liquid state detecting sensor of the invention according to claim 16 is characterized, in addition to the configuration according to any one of claims 1 to 15, by further comprising: a surrounding member in which a liquid circulation hole for circulation of the liquid is formed and which surrounds a periphery of the liquid property detecting element, wherein the surrounding member is connected to the level detecting unit in an insulated state.

In addition, the liquid state detecting sensor of the invention according to claim 17 is characterized, in addition to the configuration according to claim 15, by further comprising: a surrounding member in which a liquid circulation hole for circulation of the liquid is formed and which surrounds a periphery of the liquid property detecting element, wherein the surrounding member is connected to the level detecting in an insulated state, and a leading end of the outer cylinder electrode is located closer to the leading end of the liquid state detecting sensor than a leading end of the surrounding member.

In addition, the liquid state detecting sensor of the invention according to claim 18 is characterized, in addition to the configuration according to any one of claims 1 to 17, in that the liquid is a urea aqueous solution, and the particular component is urea.

ADVANTAGES OF THE INVENTION

In the liquid state detecting sensor of the invention according to claim 1, the level detecting unit for detecting the level of the liquid and the liquid property detecting element for detecting at least the concentration of a particular component contained in the liquid are integrated in an insulated state. Accordingly, as for the two mounting portions of the accommodating container which are required in the case where they are provided as separate units, it is sufficient if one mounting portion is provided, so that the time and trouble involved in providing the mounting portions can be alleviated, and the configuration for maintaining air-tightness and water-tightness between the mounting portion and the accommodating container can be made simple. In addition, since a sensor structure is adopted in which the level detecting unit and the liquid property detecting element are integrated, as compared with the conventional case were the level sensor and the concentration sensor are provided in the accommodating container as separate units, the volume of the sensor occupying the interior of the accommodating container can be made relatively small. This makes it possible to further increase the maximum quantity of the liquid (e.g., urea aqueous solution) accommodatable in the accommodating container than in the conventional case where they are mounted as separate units. Also, at the time of defreezing when the liquid (e.g., urea aqueous solution) is frozen, since the heat capacity is lower than the conventional level, defreezing can be carried out early, thereby permitting speedy detection of the state of the liquid.

In addition, in the liquid state detecting sensor of the invention according to claim 1, the liquid property detecting element has a heat generating resistor pattern, and this heat generating resistor pattern is located closer to the leading end of the liquid state detecting sensor than the leading end of the level detecting unit. Here, it is known that the thermal conductivity of a liquid differs depending on the concentration of a particular component contained in the liquid, and in a case where the liquid around the heat generating resistor pattern (i.e., the liquid property detecting element) is heated by it, the tendency of temperature rise differs in a liquid having a different concentration. Accordingly, in the invention, a detection circuit is provided for ascertaining the degree of temperature rise of the heat generating resistor pattern on the basis of a change of an electric property (e.g., a change of a resistance value) of the heat generating resistor pattern, and the concentration of the particular component contained in the liquid is detected by this detection circuit. By adopting this configuration, the concentration of the particular component contained in the liquid can be detected satisfactorily.

In addition, in the liquid state detecting sensor of the invention according to claim 2, the liquid property detecting element has a configuration in which the heat generating resistor pattern is embedded in an insulating ceramic substrate. As a result, even in a case where the liquid is an electrically conductive liquid, the outer surface of the insulating ceramic substrate can be brought into contact with the liquid, and the element itself can be directly immersed in the liquid. Accordingly, the sensitivity of the concentration detection of the particular component can be further enhanced.

In addition, in the liquid state detecting sensor of the invention according to claim 3, the configuration provided is such that the detection circuit energizes the heat generating resistor pattern for a fixed time duration, obtains a first corresponding value and a second corresponding value corresponding to resistance values of the heat generating resistor pattern at different timings within the fixed time duration, and detects the concentration of the particular component on the basis of the first corresponding value and the second corresponding value. By adopting such a configuration, it is possible to accurately ascertain the degree of temperature rise of the heat generating resistor pattern, and the concentration detection of the particular component can be performed stably.

It should be noted that the first corresponding value and a second corresponding value in the invention are sufficient if they are values of the same unit corresponding to the resistance value of the heat generating resistor pattern, and specifically it is possible to cite a voltage value, a current value, and a temperature conversion value. In addition, in performing the concentration detection of the particular component on the basis of the first corresponding value and a second corresponding value, the detection can be specifically carried out by using a differential value obtained from the difference between the both corresponding values or a ratio between the both corresponding values.

Furthermore, in the liquid state detecting sensor of the invention according to claim 4, since the first electrode is made a tubular outer cylinder electrode, and the second electrode is made an inner electrode provided within the outer cylinder electrode, it is possible to configure a level detecting unit which, although a simple configuration, is capable of accurately detecting the electrostatic capacity which changes in response to the level of the liquid.

In addition, in the liquid state detecting sensor of the invention according to claim 5, the inner electrode is formed into a tubular shape, and a lead wire for the liquid property detecting element is inserted in the inside thereof. Thus, since the inner electrode is used jointly as a protective member for the lead wire without needing to separately provide a protective member for protecting the lead wire, it is possible to effectively attain the miniaturization and cost reduction of the liquid state detecting sensor.

In addition, if the liquid property detecting element is held by the insulating holder and the holder is fitted to the leading end portion of the inner electrode as in the liquid state detecting sensor of the invention according to claim 6, the liquid property detecting element and the level detecting unit can be easily connected in an insulated state.

Furthermore, if the fitting of the holder to the leading end portion of the inner electrode is effected by means of a seal ring, and if an insulating film is formed on the surface of the inner electrode in a range extending at least from the position where the seal ring is disposed on the inner electrode to the outer side of its rear end portion as in the liquid state detecting sensor of the invention according to claim 7 or 8, even if the liquid property detecting element and the level detecting unit are immersed in the liquid, the surface of the inner electrode does not come into contact with the liquid. For this reason, the level detection of an electrically conductive liquid can be performed accurately. In addition, since the liquid does not enter the inner side of the inner electrode by virtue of the seal ring, the internal circuit and the like are not immersed in the liquid, so that there is no possibility of such as short-circuiting and corrosion.

In addition, in the liquid state detecting sensor of the invention according to claim 9, the liquid can be circulated between the outer side and the inner side of the outer cylinder electrode through the slit provided in the outer cylinder electrode, and a change in the level of the liquid inside the outer cylinder electrode can be made to follow a change in the level of the liquid inside the accommodating container. In addition, in a case where the liquid state detecting sensor is used in a cold region or the like and the liquid has cooled rapidly, the pressure produced due to the volumetric expansion accompanying the freezing of the liquid can be allowed to escape to outside the outer cylinder electrode through the slit. For this reason, it is possible to suppress the deformation of the outer cylinder electrode and the inner electrode ascribable to the freezing of the liquid.

In addition, in the liquid state detecting sensor of the invention according to claim 10, as the inner electrode is resiliently supported on the inner side of the outer cylinder electrode by the rubber-made supporting member, it is possible to suppress the generation of internal stress and the generation of resonance and the like due to vibration and the like, and it is possible to reduce the possibility of deformation of the inner electrode and the damage of the film in a case where the insulating film is formed on the surface of the inner electrode.

In addition, in the liquid state detecting sensor of the invention according to claim 11, the holder for holding the liquid property detecting element is supported by the aforementioned supporting member. For this reason, in the case where the holder is fitted to the leading end portion of the inner electrode, the falling off of the holder is prevented without being fixed by bonding, caulking, threaded engagement, screwing-down, or the like, so that it is possible to reduce the time and trouble involved in the manufacturing process.

In addition, in the liquid state detecting sensor of the invention according to claim 12, the liquid which is present on the leading end side of the supporting member and the liquid which is present on the rear end side of the supporting member are circulated through the liquid circulation passage formed on the supporting member. Additionally, in providing this circulation passage on the supporting member, the outer lateral surface of the supporting member may be grooved to secure the circulation passage between the supporting member and the outer cylinder electrode, as in the invention according to claim 13. Alternatively, the inner lateral surface of the supporting member may be grooved to secure the circulation passage between the supporting member and the holder or the inner electrode, as in the invention according to claim 14. Since the circulation passage is thus provided on the supporting member, it is possible to satisfactorily secure a change of the liquid in the level detecting unit. Accordingly, since the supporting member is provided, the accumulation of the liquid in the level detecting unit does not occur, so that the accuracy of the level detection can be enhanced while widely securing the range of level detection.

In addition, it is possible to allow bubbles remaining on the leading end side of the supporting member to escape to the rear end side through the circulation passage. As a result, in the case where the liquid property detecting element is immersed in the liquid, it is possible to ensure that bubbles do not remain in its surroundings, so that the detection of the concentration of the particular component of the liquid can be performed accurately.

Furthermore, in the liquid state detecting sensor of the invention according to claim 15, the liquid property detecting element is surrounded peripherally in the radial direction by the outer cylinder electrode whose leading end portion is extended. As a result, even if the liquid flows in the accommodating container due to vibration or the like, the outer cylinder electrode serves as a preventive wall to protect the liquid property detecting element, so that it is possible to suppress the pressure accompanying the flow from being directly applied to the liquid property detecting element, thereby enhancing the durability of the liquid property detecting element. In addition, the liquid surrounding the periphery of the liquid property detecting element is not replaced intensively, so that the concentration detection of the particular component can be continuously performed stably.

In addition, in the liquid state detecting sensor of the invention according to claim 16, the surrounding member having a liquid circulation hole formed therein surrounds the periphery of the liquid property detecting element. As a result, even if the liquid flows in the accommodating container due to vibration or the like, the surrounding member serves as a preventive wall to protect the liquid property detecting element, so that the pressure accompanying the flow is difficult to be directly applied. In addition, the liquid surrounding the periphery of the liquid property detecting element is not replaced intensively, so that the concentration detection of the particular component can be continuously performed stably.

In addition, in the liquid state detecting sensor of the invention according to claim 17, the arrangement provided is such that while the liquid property detecting element is covered by the surrounding member with the liquid circulation hole formed therein, this surrounding member is covered by the leading end portion of the aforementioned outer cylinder electrode. As a result, since both of the leading end of the outer cylinder electrode and the surrounding member function as protective walls for protecting the liquid property detecting element, the durability of the liquid property detecting element can be enhanced further. In addition, there is an advantage in that it is possible to effectively suppress intensive replacement of the liquid surrounding the periphery of the liquid property detecting element, so that the concentration detection of the particular component can be performed more stably.

Furthermore, the liquid state detecting sensor of the invention according to claim 18 is able to detect the level of the urea aqueous solution and the concentration of urea contained in the urea aqueous solution.

DESCRIPTION OF REFERENCE NUMERALS AND SIGNS

Figure 1:
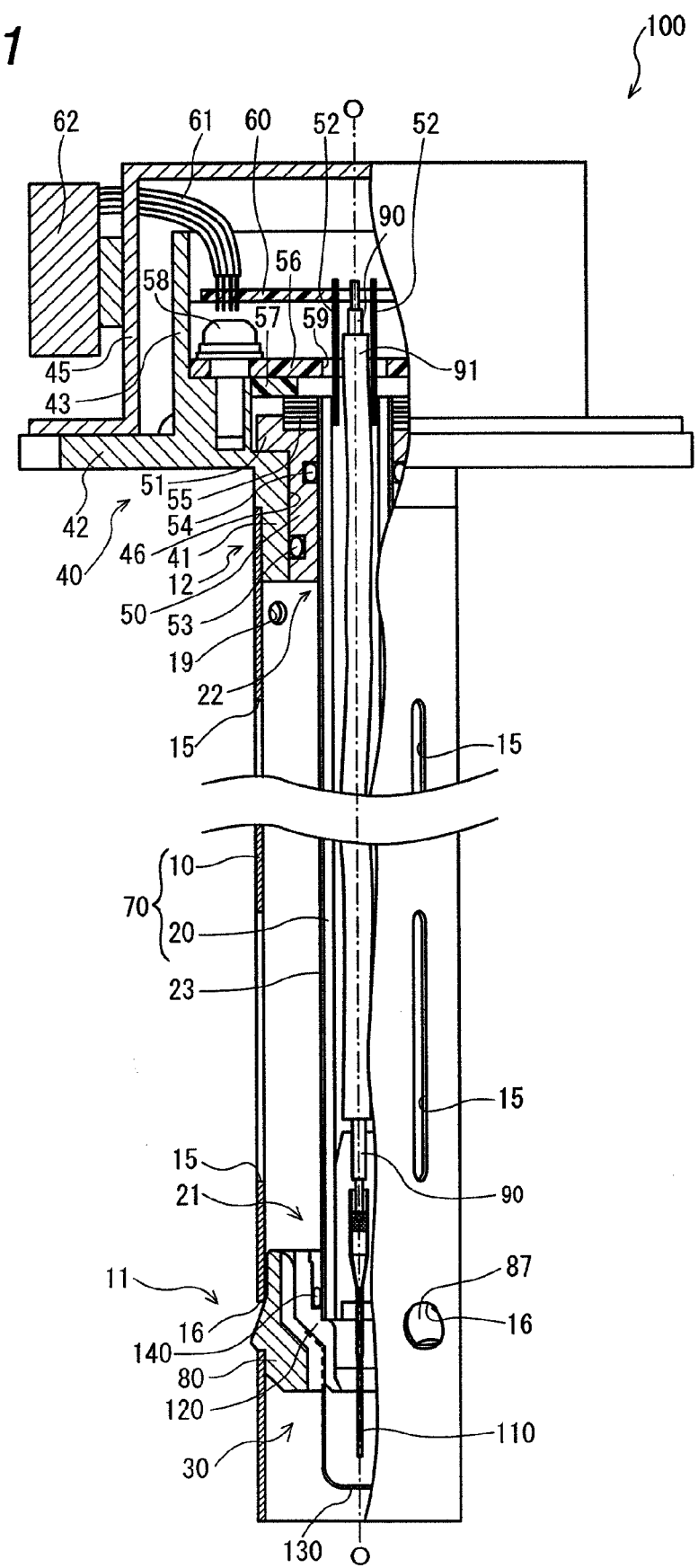
FIG. 1 is a fragmentary longitudinal cross-sectional view of a liquid state detecting sensor 100.

10: outer cylinder electrode
11: leading end portion
15: slit
20, 320, 400: inner electrode
21: leading end portion
23, 323: insulating film
30: liquid property detecting unit
40: mounting part
60: circuit board
70: level detecting unit
80: rubber bushing
85, 86: circulation passage
90: lead wire
100, 300: liquid state detecting sensor
110: ceramic heater
114: heat generating resistor pattern
115: heater pattern
120, 350: holder
130: protector
135, 136: liquid circulation hole
140, 340: seal ring
220: microcomputer
280: liquid property detecting circuit unit

BEST MODE FOR CARRYING OUT THE INVENTION

Hereafter, referring to the drawings, a description will be given of one mode of carrying out the liquid state detecting sensor embodying the invention. Referring to FIGS. 1 to 10, a description will be given of the structure of a liquid state detecting sensor 100 as one example.

Figure 2:
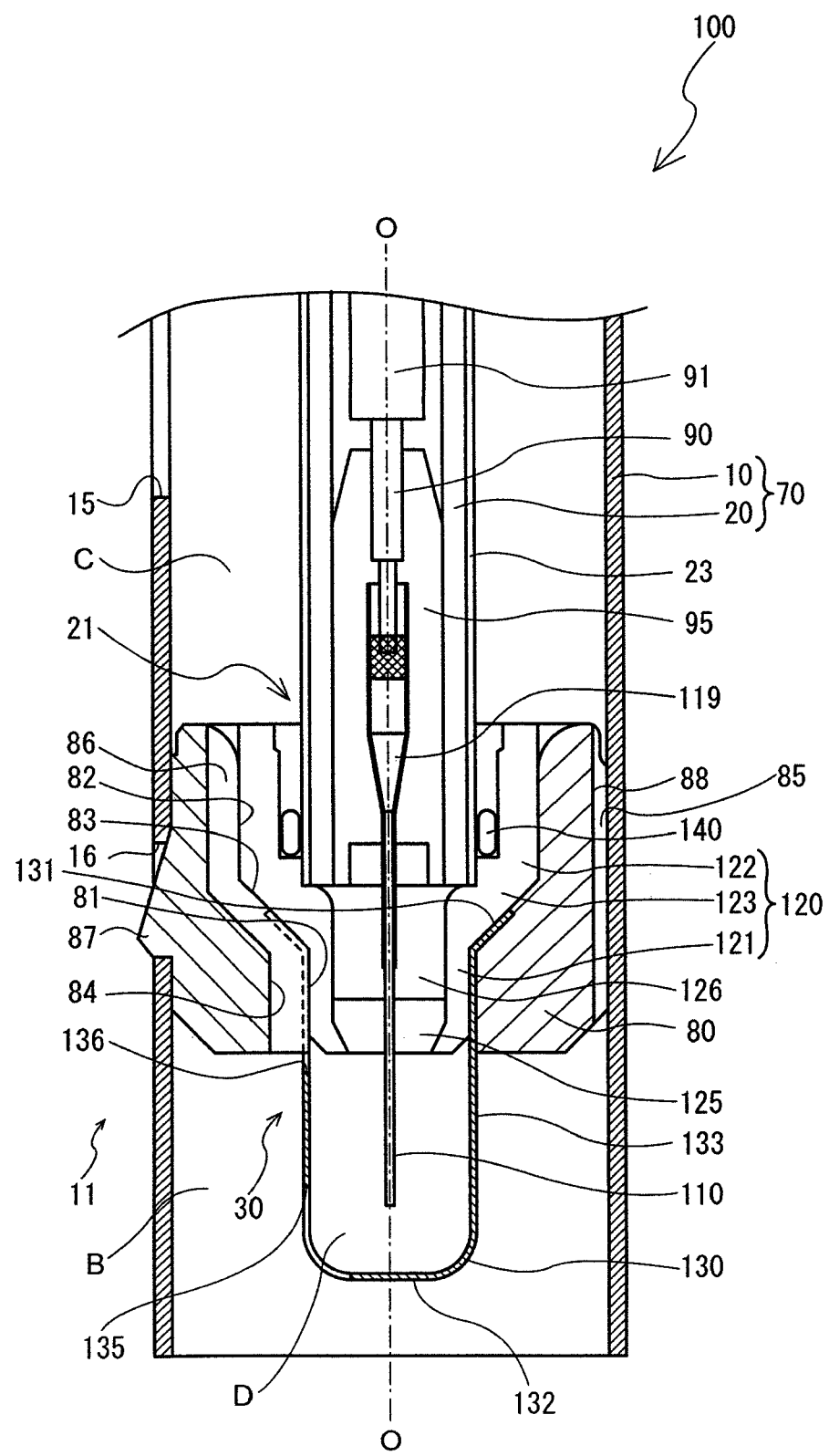
FIG. 2 is an enlarged cross-sectional view of a liquid property detecting unit 30 and its vicinities of the liquid state detecting sensor 100.
Figure 3:
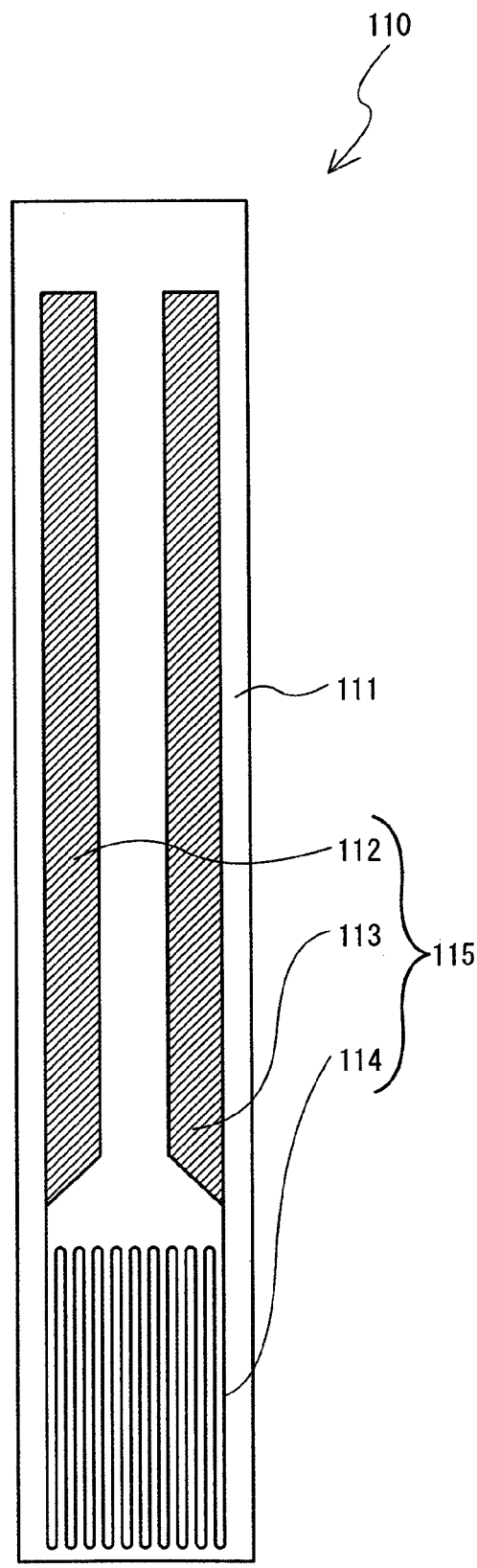
FIG. 3 is a schematic diagram illustrating a heater pattern 115 of a ceramic heater 110.
Figure 4:
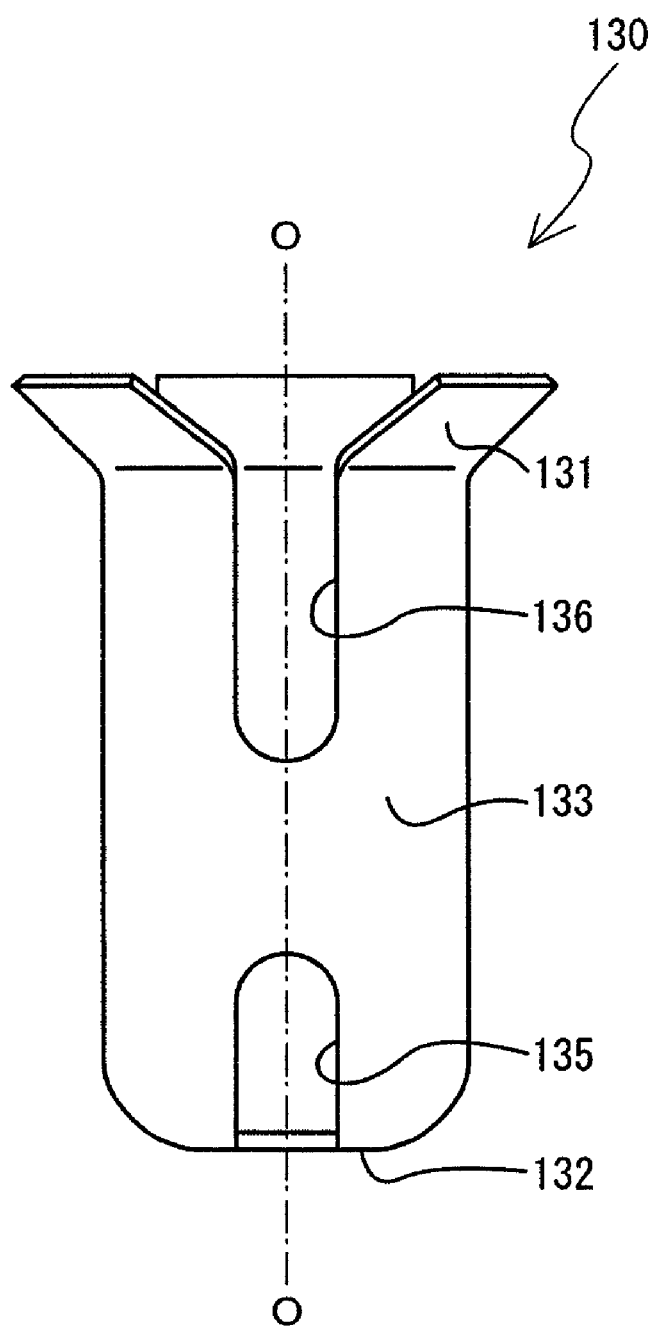
FIG. 4 is a side elevational view of a protector 130.
Figure 5:
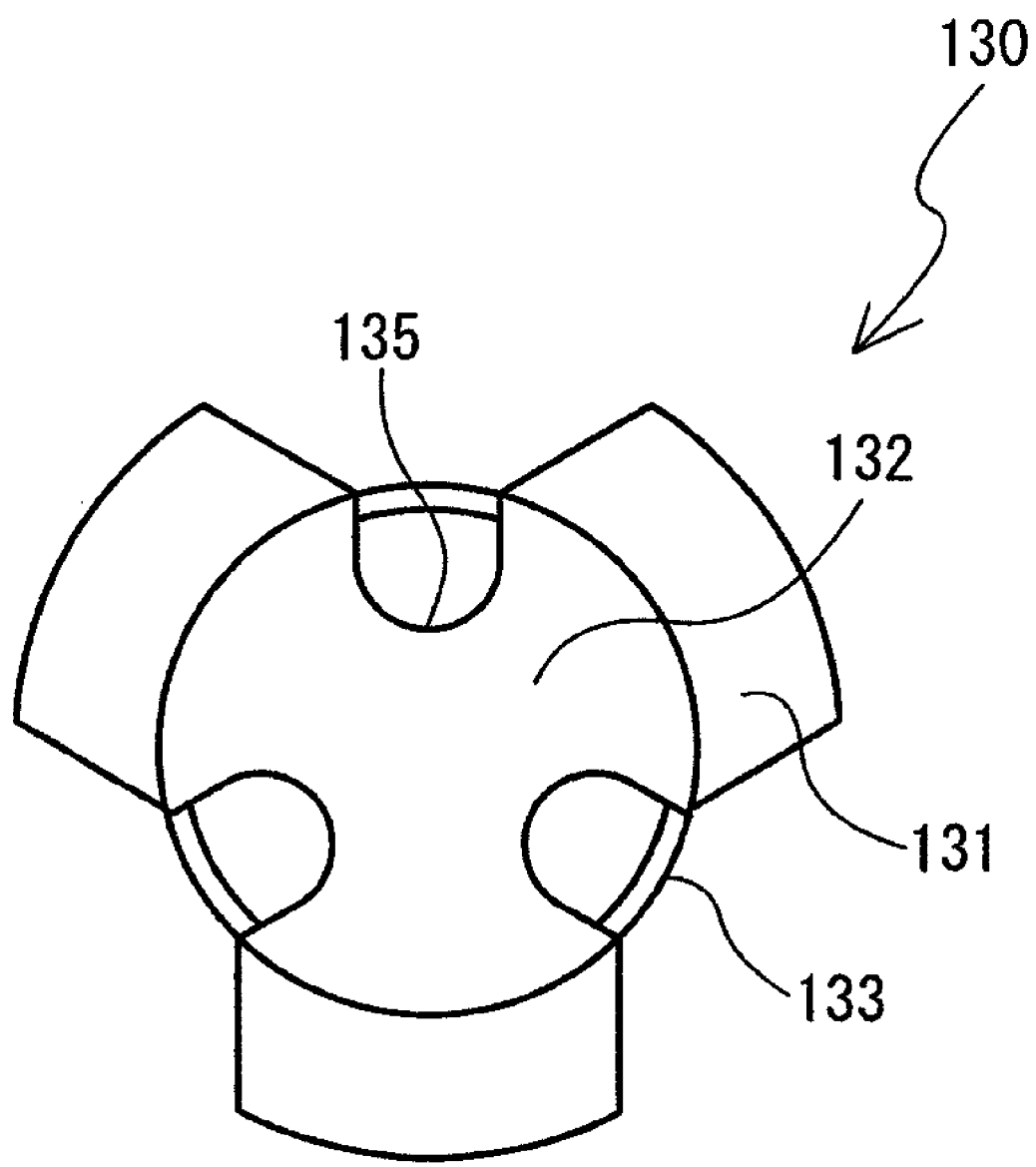
FIG. 5 is a bottom view of the protector 130.
Figure 6:
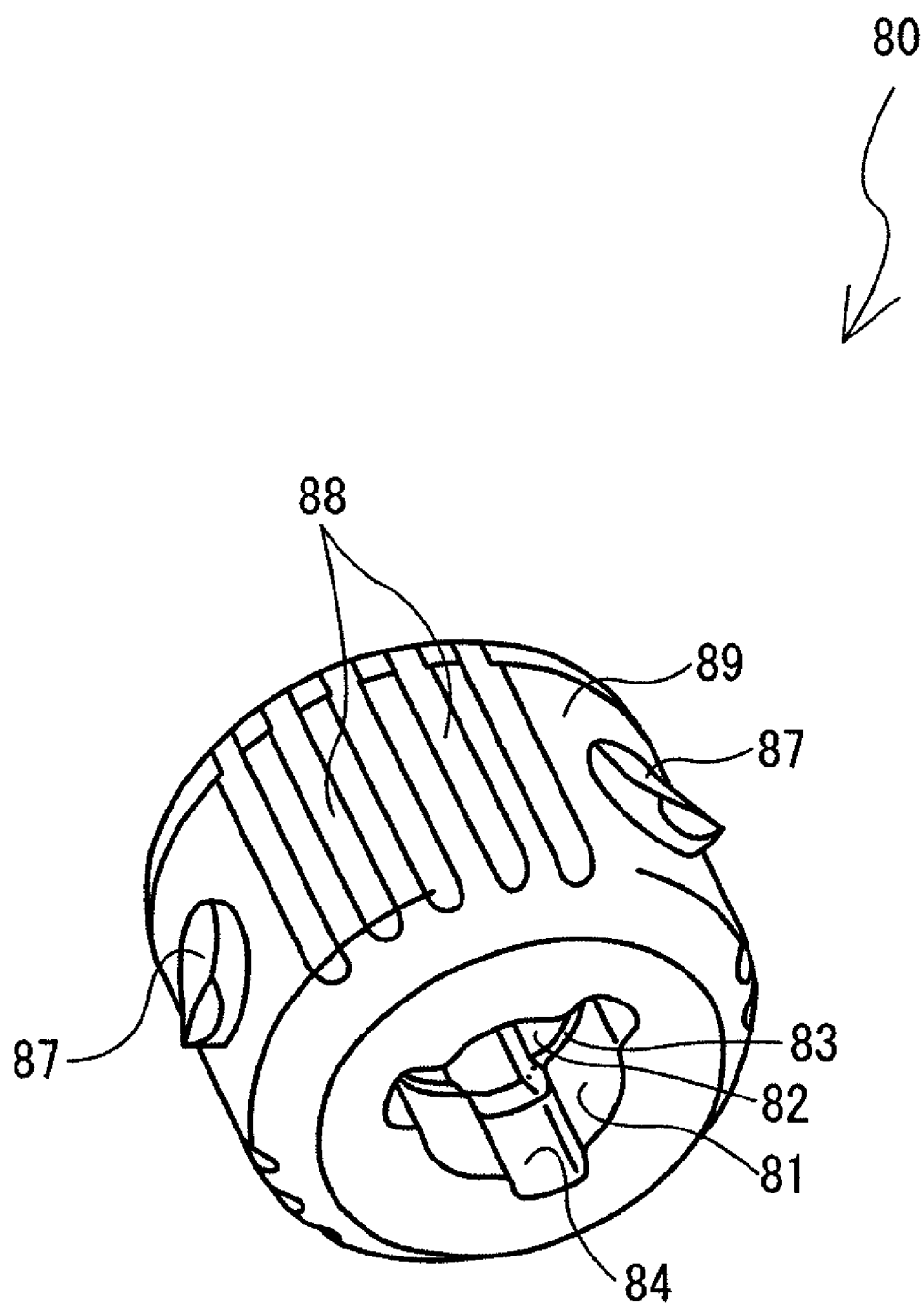
FIG. 6 is a perspective view in which a rubber bushing 80 is viewed from obliquely below.
Figure 7:
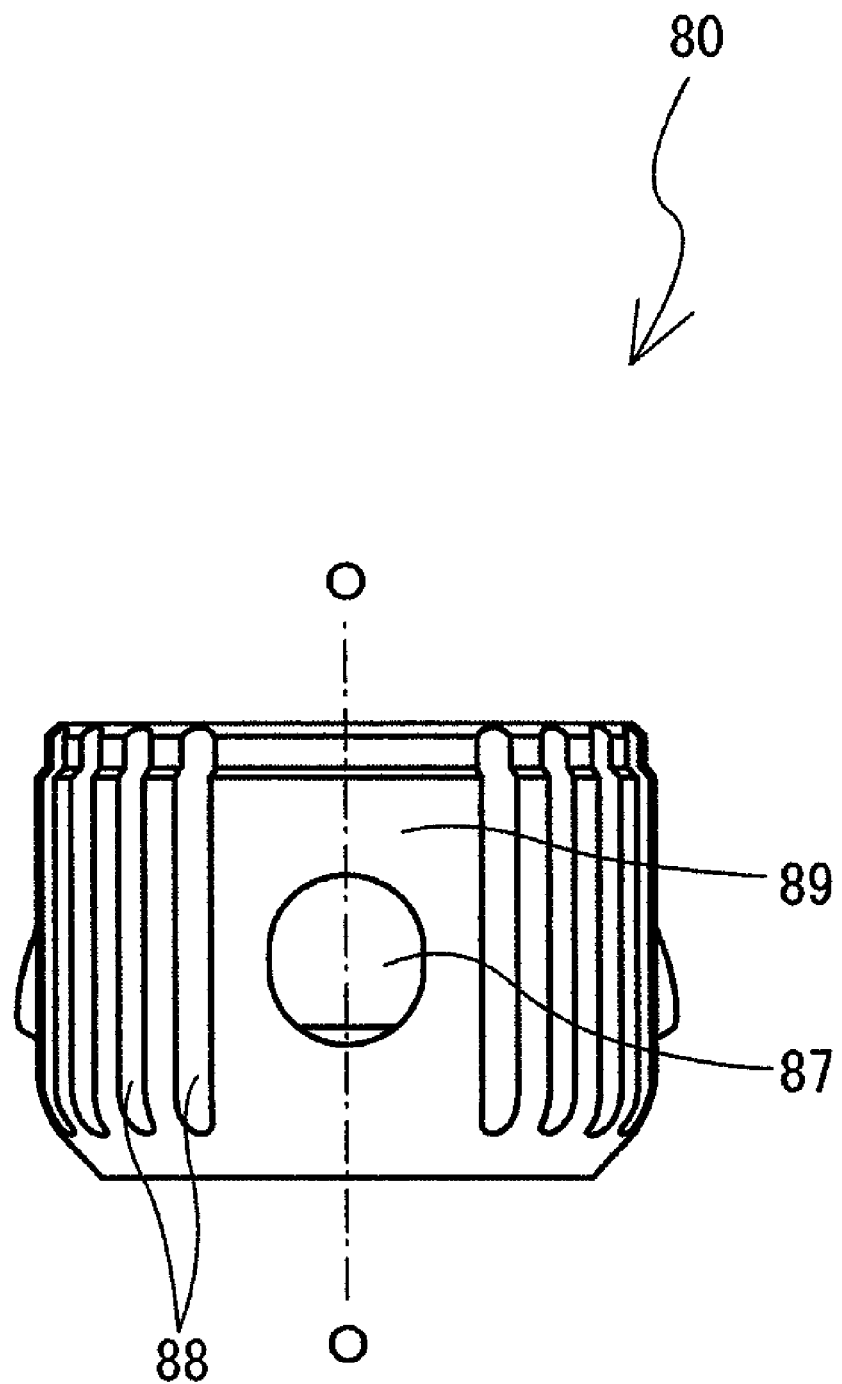
FIG. 7 is a side elevational view of the rubber bushing 80.
Figure 8:
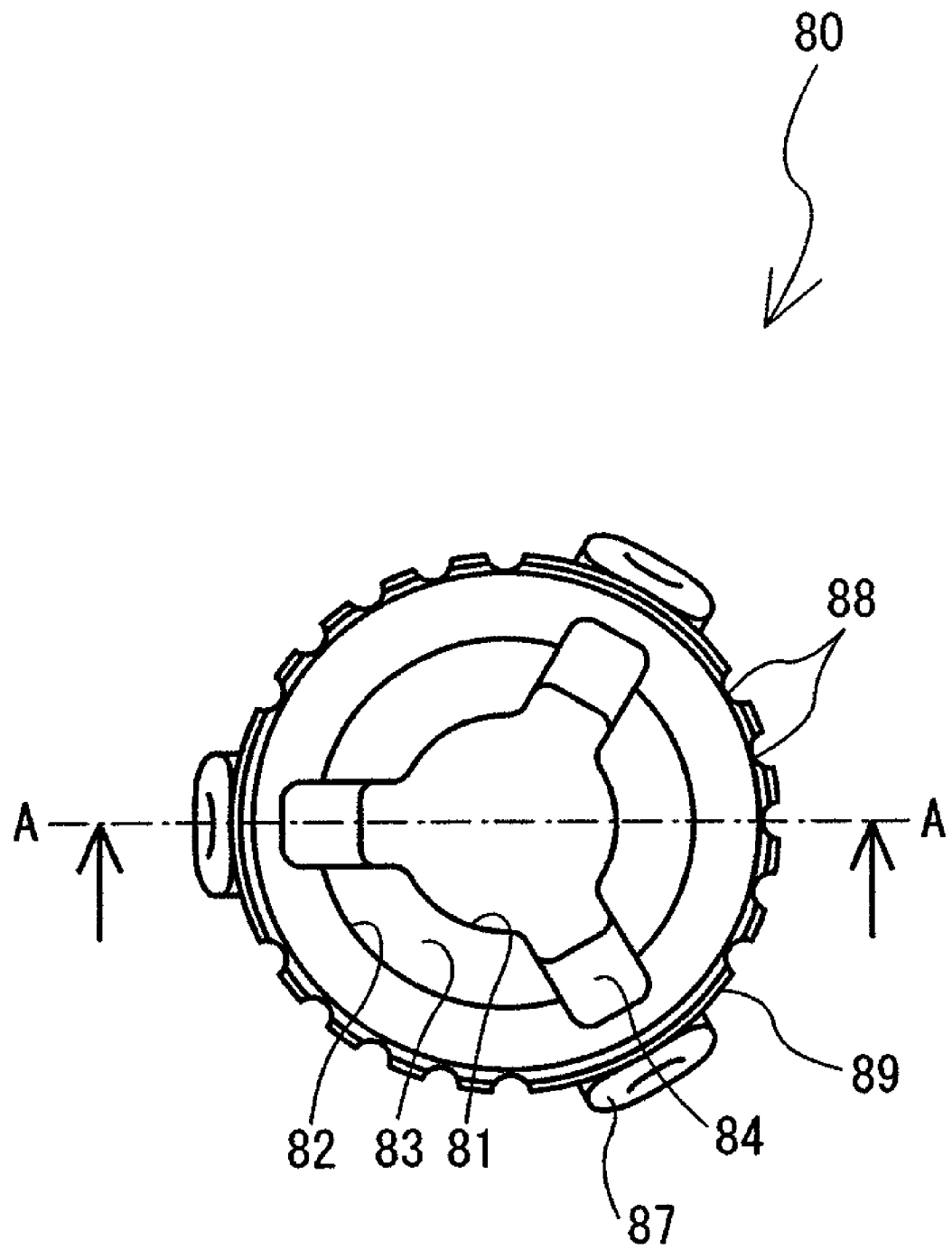
FIG. 8 is a plan view of the rubber bushing 80.
Figure 9:
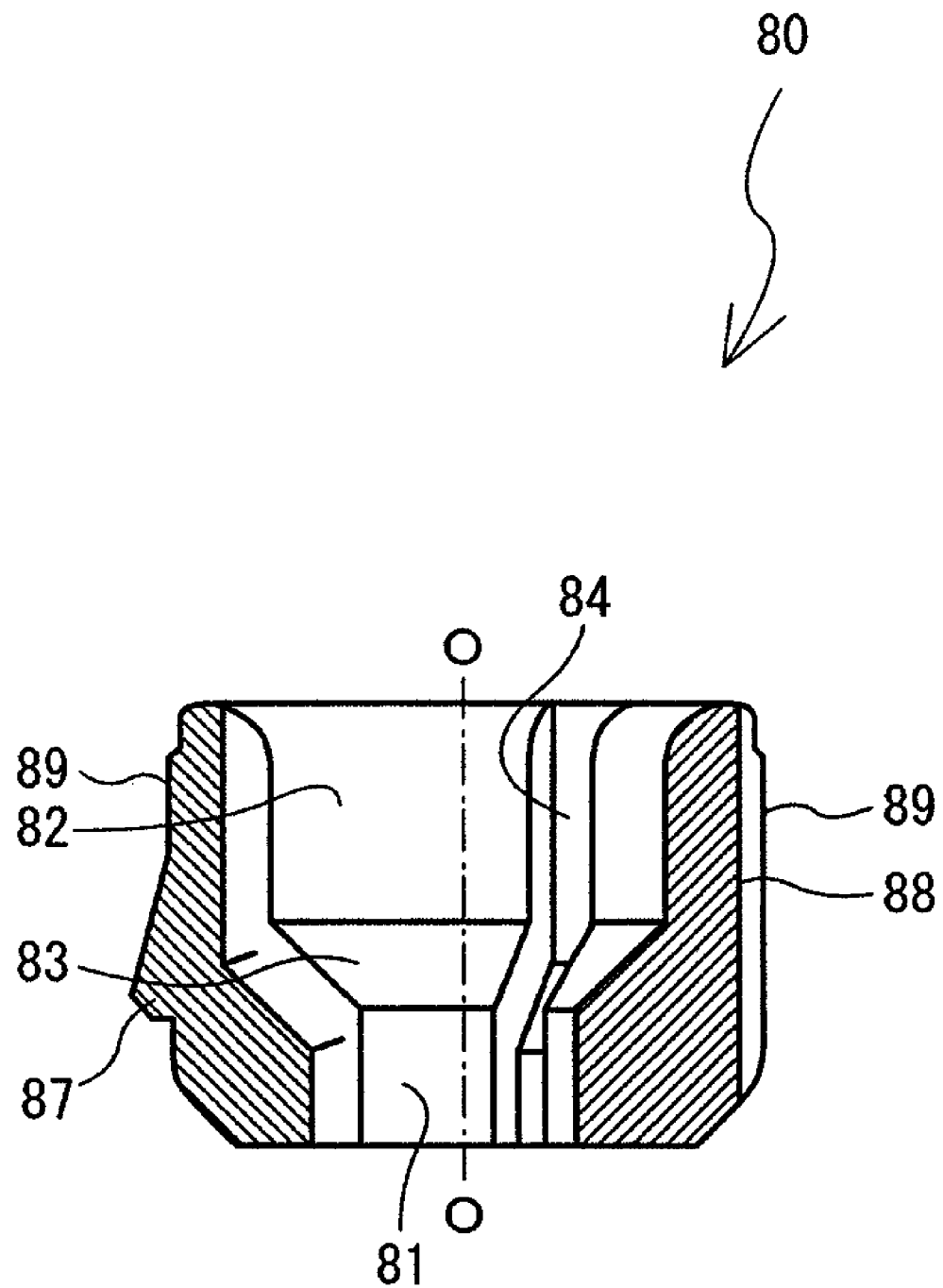
FIG. 9 is a cross-sectional view of the rubber bushing 80 taken in the direction of arrows along the alternate long and short dash line A-A in FIG. 8.
Figure 10:
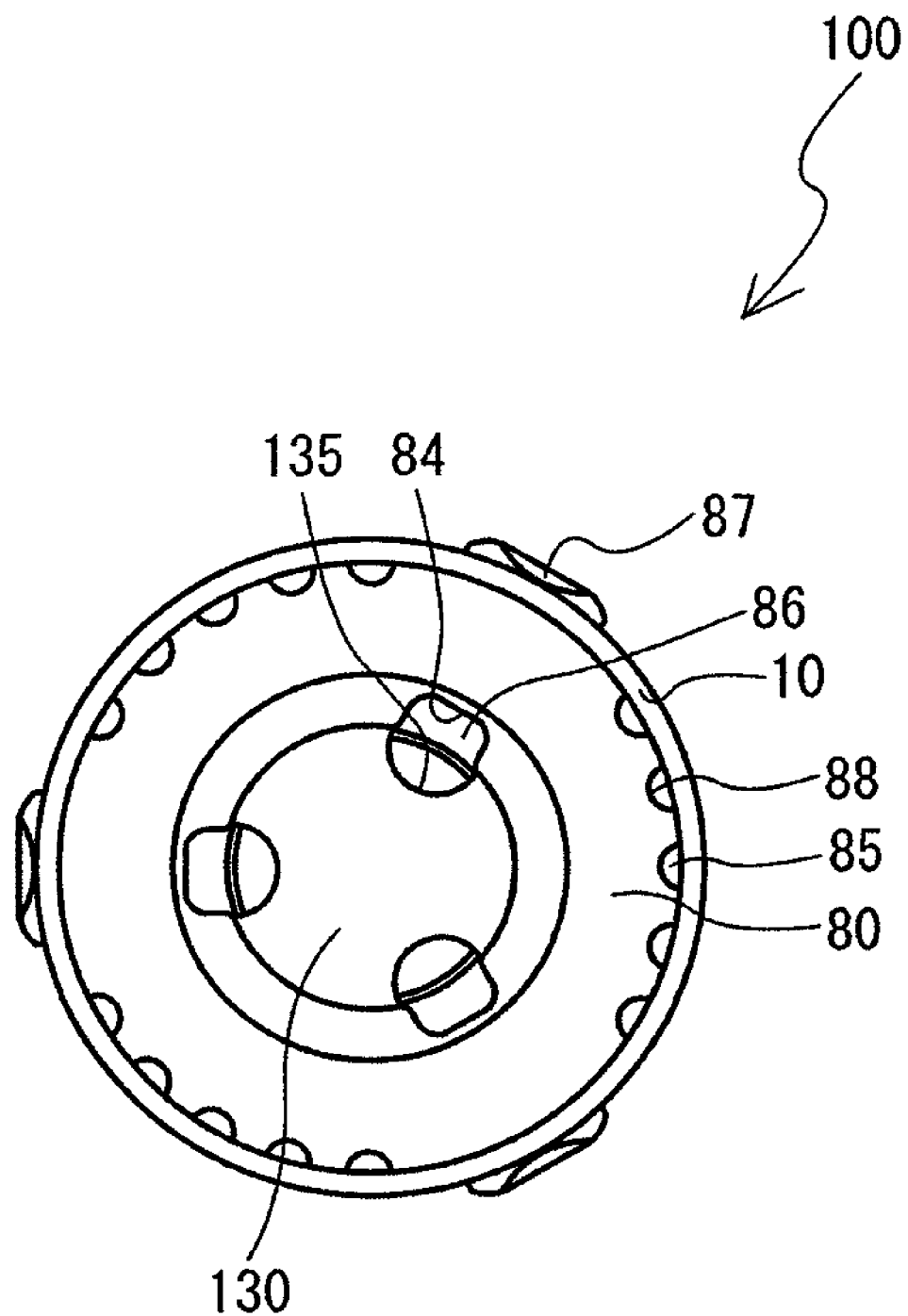
FIG. 10 is a bottom view of the liquid state detecting sensor 100 in which the liquid state detecting sensor 100 shown in FIG. 1 is viewed from the leading end side in the direction of an axis O.

FIG. 1 is a fragmentary longitudinal cross-sectional view of the liquid state detecting sensor 100. FIG. 2 is an enlarged cross-sectional view of a liquid property detecting unit 30 and its vicinities of the liquid state detecting sensor 100. FIG. 3 is a schematic diagram illustrating a heater pattern 115 of a ceramic heater 110. FIG. 4 is a side elevational view of a protector 130. FIG. 5 is a bottom view of the protector 130. FIG. 6 is a perspective view in which a rubber bushing 80 is viewed from obliquely below. FIG. 7 is a side elevational view of the rubber bushing 80. FIG. 8 is a plan view of the rubber bushing 80. FIG. 9 is a cross-sectional view of the rubber bushing 80 taken in the direction of arrows along the alternate long and short dash line A-A in FIG. 8. FIG. 10 is a bottom view of the liquid state detecting sensor 100 in which the liquid state detecting sensor 100 shown in FIG. 1 is viewed from the leading end side in the direction of an axis O. It should be noted that, in the liquid state detecting sensor 100, the longitudinal direction of a level detecting unit 70 (a capacitor configured by an outer cylinder electrode 10 and an inner electrode 20) is set as the direction of the axis O, the side where the liquid property detecting unit 30 is provided is set as the leading end side, and the side where a mounting part 40 is provided is set as the rear end side.

The liquid state detecting sensor 100 in accordance with this embodiment is a sensor for detecting the state of a urea aqueous solution used in the reduction of nitrogen oxides (NOx) contained in exhaust gases of a diesel powered automobile, i.e., the level of the urea aqueous solution, as well as the concentration of urea as a particular component contained in the urea aqueous solution. As shown in FIG. 1, the liquid state detecting sensor 100 is comprised of the level detecting unit 70 configured by the outer cylinder electrode 10 having a cylindrical shape and the cylindrical inner electrode 20 provided inside that outer cylinder electrode 10 along the direction of the axis O of the outer cylinder electrode 10; the liquid property detecting unit 30 provided on the leading end side of the inner electrode 20; and the mounting part 40 for mounting the liquid state detecting sensor 100 in a urea water tank (not shown) serving as a container for accommodating the urea aqueous solution.

The outer cylinder electrode 10 is formed of a metallic material and has an elongated cylindrical shape extending in the direction of the axis O. On three generating lines which are equally spaced circumferentially on the outer periphery of the outer cylinder electrode 10, a plurality of narrow slits 15 are respectively open discontinuously along the respective generating lines. In addition, in a leading end portion 11 of the outer cylinder electrode 10, openings 16 for preventing the coming off of the rubber bushing 80 interposed between the outer cylinder electrode 10 and the below-described inner electrode 20 are respectively provided on the generating lines where the slits 15 are formed. Further, at a position close to a base end portion 12 on the rear end side of the outer cylinder electrode 10, one air vent hole 19 is formed on a generating line different from the generating lines where the slits 15 are formed. In addition, the leading end portion 11 of the outer cylinder electrode 10 extends further to the leading end side in the direction of the axis O than the position of the opening 16, so as to surround the radial periphery of the ceramic heater 110 of the liquid property detecting unit 30 which will be described later. It should be noted that this leading end portion 11 also surrounds the radial periphery of the protector 130 covering the ceramic heater 110, and extends such that its leading end is located closer to the leading end of the liquid state detecting sensor in the direction of the axis O than the leading end of the protector 130. Further, the leading end of the outer cylinder electrode 10 is open and is set in such a state that the protector 130 is visible from the opening side.

Next, the outer cylinder electrode 10 is welded in a state in which its base end portion 12 is engaged with an outer periphery of an electrode supporting portion 41 of the metallic mounting part 40. The mounting part 40 functions as a seat for fixing the liquid state detecting sensor 100 to the urea water tank (not shown), and mounting holes (not shown) for insertion of mounting bolts are formed in a collar portion 42. In addition, an accommodating portion 43 for accommodating such as a circuit board 60 for relay provided for establishing electrical connection between the liquid state detecting sensor 100 and an external circuit (not shown) is formed on the opposite side of the electrode supporting portion 41 with the collar portion 42 of the mounting part 40 located in between. It should be noted that this mounting part 40 is connected to the circuit board 60 so as to assume the same potential as a wiring portion (not shown) serving as its ground potential. For this reason, the outer cylinder electrode 10 is grounded through this mounting part 40.

The circuit board 60 is accommodated in the mounting part 40, and is specifically mounted on board mounting portions (not shown) projecting from four corners of inner wall surfaces of the accommodating portion 43. The accommodating portion 43 is protected by being covered by a cover 45, and the cover 45 is fixed to the collar portion 42. In addition, a connector 62 is fixed to a side surface of the cover 45, and a connection terminal (not shown) of the connector 62 and a pattern on the circuit board 60 are connected by a wiring cable 61. Connection between the circuit board 60 and the external circuit (not shown) is established through this connector 62.

A hole 46 penetrating through the accommodating portion 43 is open in the electrode supporting portion 41 of the mounting part 40, and a base end portion 22 of the inner electrode 20 is inserted in this hole 46. The inner electrode 20 in this embodiment is formed of a metallic material having an elongated cylindrical shape and extending in the direction of the axis O. An insulating film 23 made of a fluorocarbon resin such as PTFE, PFA, and ETFE, an epoxy resin, a polyimide resin, or the like is formed on the outer peripheral surface of this inner electrode 20. The insulating film 23 is formed in the form of a resin coating layer by applying such a resin to the outer surface of the inner electrode 20 by dipping or electrostatic powder coating and by subjecting it to heat treatment. The level detecting unit 70 is configured so that a capacitor, whose electrostatic capacity changes in correspondence with the level of the urea aqueous solution, is formed between the inner electrode 20 and the outer cylinder electrode 10, as will be described later. It should be noted that the insulating film 23 of the inner electrode 20 is formed at least in a range from a point of contact with a seal ring 140 to a point of contact with an O-ring 54, which will be described later, and coats the outer peripheral surface of the inner electrode 20 so that the inner electrode 20 is not brought into contact with the urea aqueous solution inside the outer cylinder electrode 10.

A pipe guide 55 and an inner casing 50 for fixing the inner electrode 20 to the mounting part 40 are engaged with the base end portion 22 of the inner electrode 20 on the rear end side in the direction of the axis O. The pipe guide 55 is an annular guide member which is joined nearer to the edge of the base end portion 22 of the inner electrode 20. The inner casing 50 is a collared tubular resin-made member for positioning and supporting the inner electrode 20 so as to reliably insulate the inner electrode 20 and the outer cylinder electrode 10, and its leading end side is engaged in the hole 46 of the electrode supporting portion 41 of the mounting part 40. The inner casing 50 has a collar portion 51 formed in such a manner as to protrude toward the radially outer side, and is inserted into the hole 46 of the electrode supporting portion 41 from the accommodating portion 43 side when the inner casing 50 is engaged with the electrode supporting portion 41. Further, as the collar portion 51 abuts against the inner bottom of the accommodating portion 43, the inner casing 50 is prevented from passing through the hole 46. In addition, although the inner electrode 20 is inserted into the inside of the inner casing 50 from the accommodating portion 43 side, the inner electrode 20 is prevented from falling off the inner casing 50 as the pipe guide 55 abuts against the collar portion 51.

Furthermore, an O-ring 53 and the O-ring 54 are respectively provided on the outer periphery and the inner periphery of the inner casing 50. The O-ring 53 seals the gap between the outer periphery of the inner casing 50 and the hole 46 of the mounting part 40, and the O-ring 54 seals the gap between the inner periphery of the inner casing 50 and the outer periphery of the base end portion 22 of the inner electrode 20. This maintains the water-tightness and air-tightness so that the inside and the outside of the urea water tank will not communicate through the accommodating portion 43 when the liquid state detecting sensor 100 is mounted in the urea water tank (not shown). It should be noted that an unillustrated plate-like seal member is fitted on an leading end side surface of the collar portion 42 of the mounting part 40, so that water-tightness and air-tightness are adapted to be maintained between the collar portion 42 and the urea water tank when the liquid state detecting sensor 100 is mounted in the urea water tank.

In addition, at the time of assembly of the inner electrode 20 to the mounting part 40, the pipe guide 55 is pressed against the collar portion 51 of the inner casing 50 by two pressing plates 56 and 57. The insulating pressing plate 57 is fixed in the accommodating portion 43 by screws 58 in a state in which the pressing plate 57 presses the pipe guide 55 with the pressing plate 56 placed between the same and the pipe guide 55. This allows the inner electrode 20 joined to the pipe guide 55 to be fixed to the electrode supporting portion 41. In each of the pressing plates 56 and 57, a hole 59 is open in the center, and an electrode lead wire 52 of the inner electrode 20 and a two-core cable 91 containing two lead wires 90 (only one lead wire 90 being shown in FIG. 1) for establishing electrical connection with the below-described ceramic heater 110 are inserted therein and are respectively connected electrically to patterns on the circuit board 60. A ground-side electrode (not shown) of the circuit board 60 is connected to the mounting part 40, and the outer cylinder electrode 10 welded to the mounting part 40 is thereby connected electrically to the ground side.

Next, the liquid property detecting unit 30 is connected to a leading end portion 21 of the inner electrode 20. As shown in FIG. 2, the liquid property detecting unit 30 in this embodiment is comprised of the ceramic heater 110 serving as a liquid property detecting element for detecting the concentration of urea in the urea aqueous solution; an insulating resin-made holder 120 which supports the ceramic heater 110 and is fitted on the leading end portion 21 of the inner electrode 20; and the protector 130 for protecting the ceramic heater 110 by covering the periphery of the ceramic heater 110 exposed from the holder 120.

As shown in FIG. 3, as for the ceramic heater 110, the heater pattern 115 made mainly of Pt is formed on a plate-like ceramic substrate 111 formed of an insulating ceramic (specifically alumina), and the heater pattern 115 is formed in an embedded state with the heater pattern 115 sandwiched between that ceramic substrate and a mating ceramic substrate (not shown). The arrangement provided is such that heat generation is effected mainly in a heat generating resistor pattern 114 during energization by making the cross-sectional area of the pattern making up the heat generating resistor pattern 114 smaller than those of lead portions 112 and 113 serving as both poles for application of voltage. In addition, via conductors (not shown), which electrically conduct to electrode pads provided on the surface of one ceramic substrate, are provided at both ends of the lead portions 112 and 113 and are electrically connected to respective ones of two connectors 119 (only one is shown in FIG. 2) for relaying the connection with the two lead wires 90. It should be noted that the ceramic heater 110 corresponds to the "liquid property detecting element" in the invention.

Next, as shown in FIG. 2, the holder 120 for supporting the ceramic heater 110 is configured to cover the leading end portion 21 of the inner electrode 20 from its outer periphery. The holder 120 has two cylindrical portions 121 and 122 having different outside diameters, and the cylindrical portions 121 and 122 are connected by a tapered stepped portion 123. Further, an edge portion of a tubular end on the small-diameter cylindrical portion 121 side of the holder 120 is chamfered. In a state in which the lead portions 112 and 113 (see FIG. 3) side in the longitudinal direction is inserted into the small-diameter cylindrical portion 121, and the portion where the heat generating resistor pattern 114 is disposed is exposed, the ceramic heater 110 is fixed to the holder 120 by fixing members and 126 configured by an adhesive or the like.

In addition, the inside diameter of the large-diameter cylindrical portion 122 is configured to be greater than the outside diameter of the leading end portion 21 of the inner electrode 20. When the holder 120 is fitted to the leading end portion 21 of the inner electrode 20 from the cylindrical portion 122 side, the seal ring 140 is interposed between the inner peripheral surface of the cylindrical portion 122 and the outer peripheral surface of the inner electrode 20, thereby ensuring water-tightness inside the inner electrode 20. The insulating film 23 is formed on the outer peripheral surface of the inner electrode 20 in a range extending from the leading end side of the position where this seal ring 140 is disposed at the leading end portion 21 on the leading end side of the inner electrode 20 to a position where the O-ring 54 is disposed at the base end portion 22 on the rear end side. Hence, even if the level detecting unit 70 is immersed in the urea aqueous solution inside the urea water tank (not shown), the inner electrode 20 does not come into direct contact with the urea aqueous solution.

Incidentally, before the fitting of the holder 120, conductors of the two lead wires 90 of the cable 91 are respectively joined to the connectors 119 of the ceramic heater 110 by crimping or soldering. Further, the connectors 119 and the lead wires 90, including their joint portions, are covered by an insulating protection member 95. Further, the two lead wires 90 are inserted in the inner electrode 20 of the cylindrical shape and are connected to the aforementioned circuit board 60.

Next, the protector 130 shown in FIGS. 4 and 5 is a metallic protective member formed into a bottomed cylindrical shape. A collar portion 131 of a shape in which it is flared in an oblique direction with respect to the direction of the axis O is formed at its end portion on the opening side, and an edge portion between a bottom portion 132 and a trunk portion 133 is chamfered into a curved surface to enhance rigidity. In addition, liquid circulation holes 135 which are open from the bottom portion 132 through the trunk portion 133, as well as liquid circulation holes 136 which are open from the trunk portion 133 through the collar portion 131, are respectively formed on three generating lines which are equally spaced circumferentially on the outer periphery of the protector 130. The liquid circulation holes 135 on the three generating lines are not connected to each other in the bottom portion 132. It should be noted that the protector 130 corresponds to the "surrounding member" in the invention.

Further, as shown in FIG. 2, the protector 130 at its inner periphery on the opening side is fitted to the outer periphery of the small-diameter cylindrical portion 121 of the holder 120, and the collar portion 131 is engaged in such a manner as to extend along the inclined surface of the stepped portion 123 of the holder 120. The ceramic heater 110 whose portion where the heat generating resistor pattern 114 is disposed is exposed from the leading end of the holder 120 is accommodated in the protector 130, and a portion of this ceramic heater 110 at the leading end and its vicinity is directly immersed in the liquid.

The liquid property detecting unit 30 of this configuration is connected to the level detecting unit 70 in an insulated state as the holder 120 is fitted to the leading end portion 21 of the inner electrode 20. Further, the liquid property detecting unit 30 together with the leading end portion 21 of the inner electrode 20 is positioned and supported in the outer cylinder electrode 10 by the rubber-made rubber bushing 80 interposed between the inner side of the outer cylinder electrode 10 and the outer side of the inner electrode 20.

As shown in FIGS. 6 to 9, the rubber bushing 80 has a cylindrical shape and has projecting portions 87 which are provided on three generating lines equally spaced circumferentially on its outer peripheral surface 89, and which are respectively engaged with the openings 16 of the outer cylinder electrode 10 and function to prevent detachment. Further, a plurality of (in this embodiment, five) groove portions 88 respectively extending along the direction of the axis O are provided by grooving between adjacent ones of the projecting portions 87 in the circumferential direction on the outer peripheral surface 89. It should be noted that the rubber bushing 80 corresponds to the "supporting member" in this invention.

In addition, the surface on the inner peripheral surface side of the rubber bushing 80 is comprised of two inner peripheral surfaces 81 and 82 having different inside diameters and formed to allow the outer peripheral surface of the holder 120 to engage therewith as well as a tapered inner peripheral surface 83 connecting them. Further, groove portions 84 which are continuous on the inner peripheral surfaces 81, 83, and 82 from the small-diameter inner peripheral surface 81 side to the large-diameter inner peripheral surface 82 are respectively provided by grooving at the positions corresponding to the respective generating lines on the outer peripheral surface 89 where the projecting portions 87 are formed. It should be noted that the portion of the rubber bushing 80 where the small-diameter inner peripheral surface 81 is formed is formed with a greater wall thickness than the portion where the large-diameter inner peripheral surface 82 is formed.

When the rubber bushing 80 is disposed between the inner side of the outer cylinder electrode 10 and the outer side of the inner electrode 20, the positions where the liquid circulation holes 135 of the protector 130 are aligned with the positions where the groove portions 84 on the inner peripheral surfaces 81 to 83 side of the rubber bushing 80 are formed, so as to perform assembly. In addition, the inner electrode 20 is pressed toward the leading end side in the direction of the axis O by the two pressing plates 56 and 57 through the pipe guide 55 (see FIG. 1), as described before. As a result, as shown in FIG. 2, the stepped portion 123 of the holder 120 fitted to the leading end portion 21 of the inner electrode 20 is set in a state of being pressed against the inner peripheral surface 83 of the rubber bushing 80. At this time, as the collar portion 131 of the protector 130 is sandwiched between the inner peripheral surface 83 of the rubber bushing 80 and the stepped portion 123 of the holder 120, the protector 130 is held resiliently. Further, the holder 120 and the inner electrode 20 are resiliently supported on the inner side of the outer cylinder electrode 10 by the rubber bushing 80 positioned and held in the outer cylinder electrode 10.

When the liquid state detecting sensor 100 is mounted in the urea water tank (not shown) and is used, the urea aqueous solution flows into the outer cylinder electrode 10, i.e., into a B portion on the leading end side in the direction of the axis O of the rubber bushing 80 and a C portion on the rear end side thereof, through the opening at the distalmost end portion in the direction of the axis O of the outer cylinder electrode 10 and the slits, respectively. In addition, the urea aqueous solution flows into a D portion inside the protector 130 from the B portion through the liquid circulation holes 135 and 136.

Further, the urea aqueous solution which flowed into the B portion and the C portion is circulated through circulation passages 85 formed by the groove portions 88 of the rubber bushing 80 and the inner peripheral surface of the outer cylinder electrode 10 and through circulation passages 86 formed by the groove portions 84 and the outer peripheral surface of the holder 120. Further, the circulation passages 86 continue to the liquid circulation holes 136 (see FIG. 4) of the protector 130 arranged in alignment with the positions where the groove portions 84 are formed (see FIG. 10). As a result, the circulation of the urea aqueous solution takes place between the B portion and the C portion and between the D portion and the C portion through the circulation passages 85 and 86. In addition, although there is a possibility of air (bubbles) remaining in the B portion and the D portion when the empty urea water tank is filled with the urea aqueous solution, the air remaining in the B portion is capable of reaching the C portion through the circulation passages 85 and 86. At this time, since the edge portion of the tubular end on the small-diameter cylindrical portion 121 side of the holder 120 is chamfered, the remaining air is likely to be collected at the chamfered portion and is easily moved smoothly to the circulation passages 86 through the liquid circulation holes 136.

It should be noted that, in the liquid state detecting sensor 100 in this embodiment, the ceramic heater 110 configuring the liquid property detecting element is connected to the level detecting unit 70 in an insulated state by means of the insulating resin-made holder 120 and the rubber bushing 80. Further, as shown in FIG. 2, the leading end portion of the ceramic heater 110 (specifically, the portion where the heat generating resistor pattern 114 is disposed) is located closer to the leading end of the liquid state detecting sensor than the longitudinal leading end of the level detecting unit 70 (in this embodiment, corresponding to a rearmost end of a region where the seal ring 140 and the insulating film 23 formed on the inner electrode 20 come into contact). As a result, in the liquid state detecting sensor 100 in this embodiment, the urea concentration of the urea aqueous solution can be reliably detected while the level of the urea aqueous solution is not lower than the level detecting unit 70.

Figure 13:
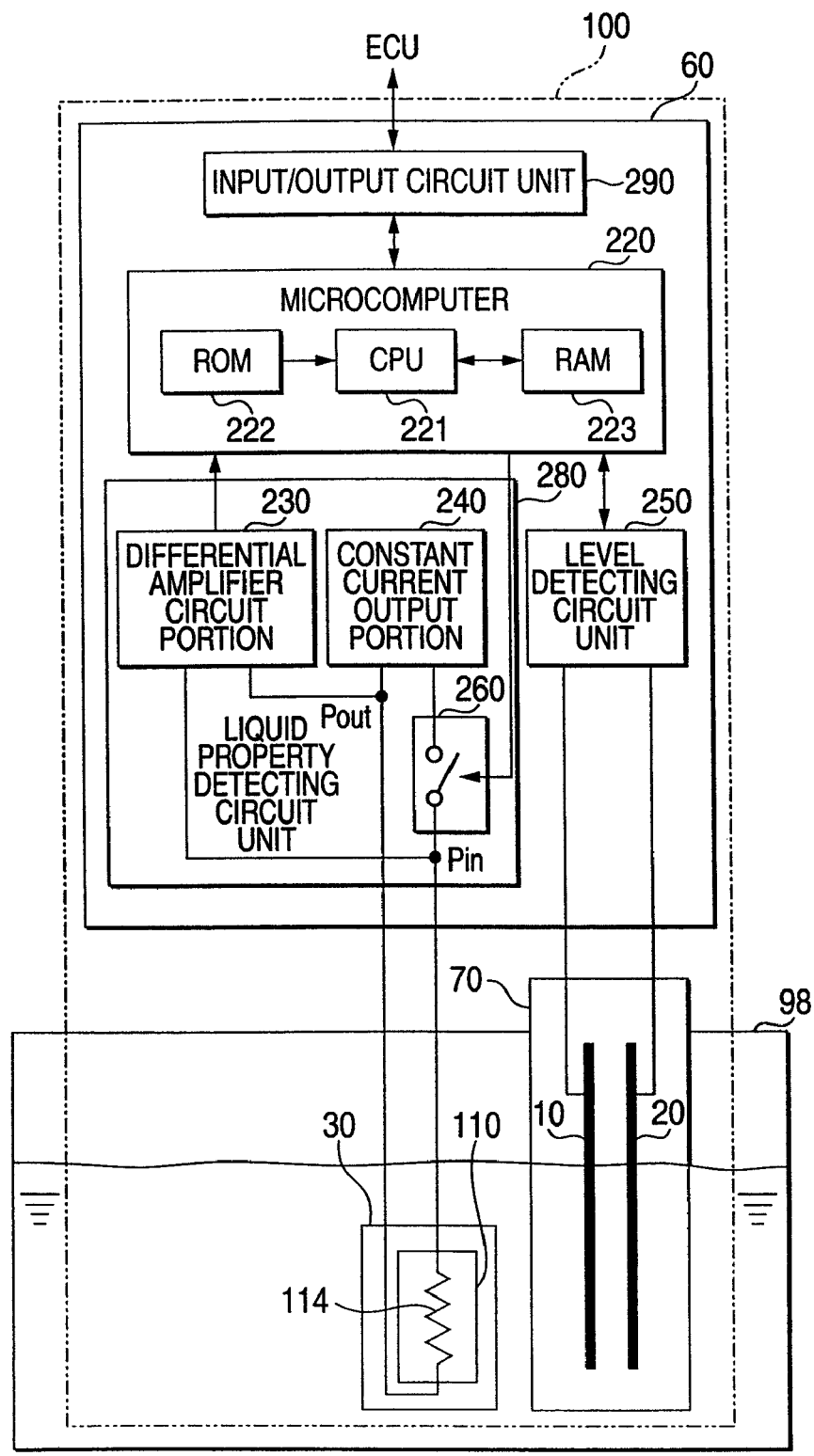
FIG. 13 is a block diagram illustrating the electrical configuration of the liquid state detecting sensor 100.

Next, referring to FIG. 13, a description will be given of the electrical configuration of the liquid state detecting sensor 100. FIG. 13 is a block diagram illustrating the electrical configuration of the liquid state detecting sensor 100.

As shown in FIG. 13, the liquid state detecting sensor 100 is mounted in a urea water tank 98 by means of the mounting part 40, an the level detecting unit 70 having the pair of electrodes (the outer cylinder electrode 10 and the inner electrode 20) as well as the liquid property detecting unit 30 having the ceramic heater 110 provided with the heat generating resistor pattern 114 are immersed in the urea aqueous solution. The liquid state detecting sensor 100 has a microcomputer 220 mounted on the circuit board 60, and a level detecting circuit unit 250 for performing control of the level detecting unit 70, a liquid property detecting circuit unit 280 for performing control of the liquid property detecting unit 30, and an input/output circuit unit 290 for effecting communication with an ECU are connected thereto.

The input/output circuit unit 290 performs control of a communication protocol to effect input/output of a signal between the liquid state detecting sensor 100 and the ECU. In addition, the level detecting circuit unit 250 is a circuit portion which, on the basis of an instruction from the microcomputer 220, applies an ac voltage across the outer cylinder electrode 10 and the inner electrode 20 of the level detecting unit 70, subjects an electric current flowing through a capacitor configuring the level detecting unit 70 to voltage conversion, and outputs that voltage signal to the microcomputer 220.

The liquid property detecting circuit unit 280 is a circuit portion which, on the basis of an instruction from the microcomputer 220, passes a constant electric current through the ceramic heater 110 of the liquid property detecting unit 30 and outputs a detection voltage generated across the both ends of the heat generating resistor pattern 114 to the microcomputer 220. The liquid property detecting circuit unit 280 consists of a differential amplifier circuit portion 230, a constant current output portion 240, and a switch 260.

The constant current output portion 240 outputs a constant electric current to be passed through the heat generating resistor pattern 114. The switch 260 is provided on a path of energization to the heat generating resistor pattern 114 and performs switching (on/off) in accordance with an instruction from the microcomputer 220. The differential amplifier circuit portion 280 outputs a difference between a potential Pin appearing at one end of the heat generating resistor pattern 114 and a potential Pout appearing at the other end thereof to the microcomputer 220 as a detection voltage.

Figure 11:
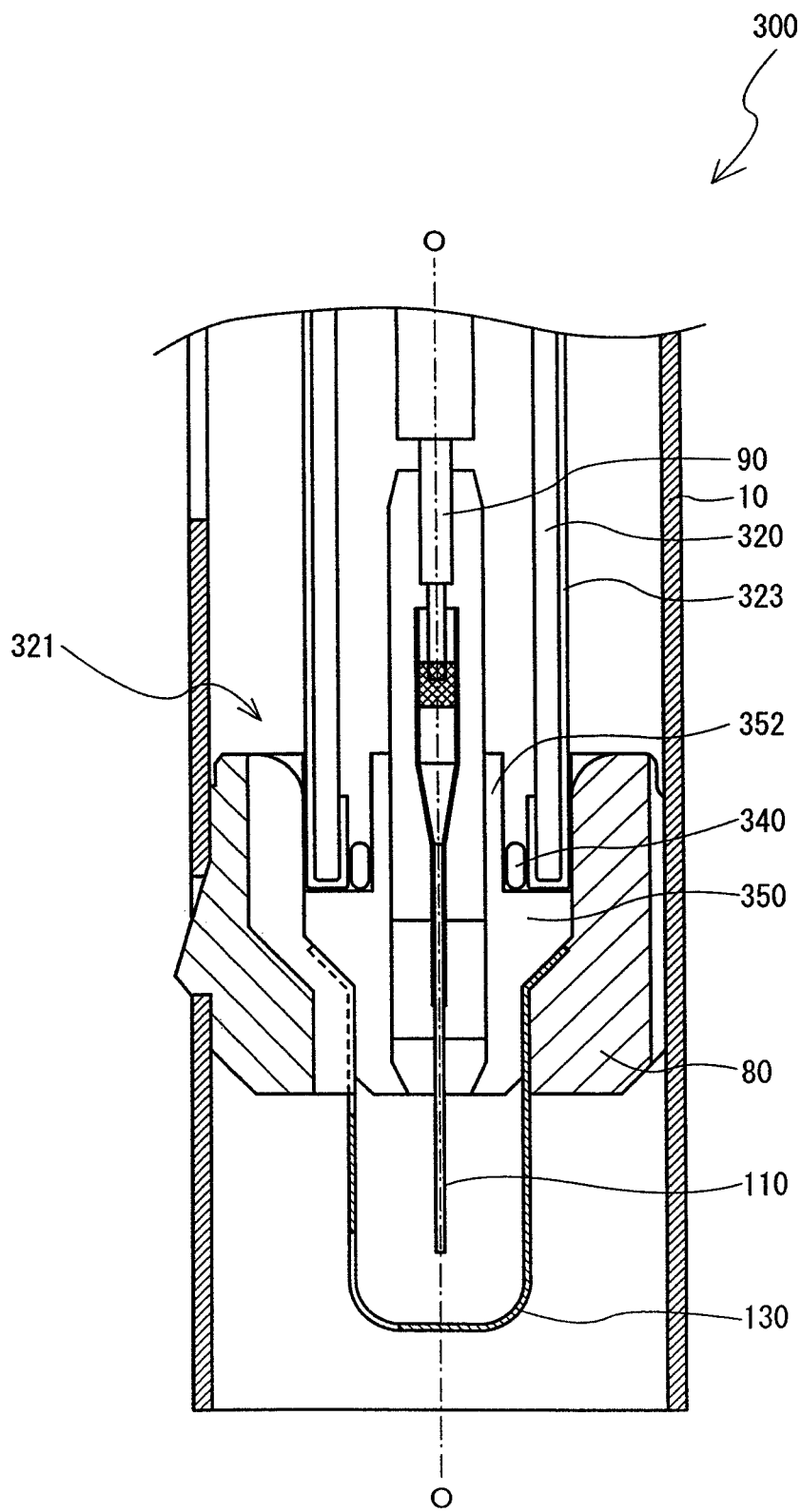
FIG. 11 is an enlarged cross-sectional view of the vicinities of a liquid property detecting unit 430 of a liquid state detecting sensor 300 as a modification.

Next, a description will be given of the principle whereby the level and the concentration of the urea aqueous solution are detected by the liquid state detecting sensor 100 of this embodiment. First, referring to FIG. 11, a description will be given of the principle whereby the level of the urea aqueous solution is detected by the level detecting unit 70. FIG. 11 is an enlarged cross-sectional view of the vicinities of the aqueous surface of the urea aqueous solution filled in the gap between the outer cylinder electrode 10 and the inner electrode 20.

Next, a description will be given of the principle whereby the level and the concentration of the urea aqueous solution are detected by the liquid state detecting sensor 100 of this embodiment. First, a description will be given of the principle whereby the level of the urea aqueous solution is detected by the level detecting unit 70.

The liquid state detecting sensor 100 is assembled to the urea water tank accommodating the urea aqueous solution in a state in which the leading end sides of the outer cylinder electrode 10 and the inner electrode 20 are oriented toward its bottom wall side. In other words, the level detecting unit 70 of the liquid state detecting sensor 100 is assembled to the urea water tank such that the direction of displacement of the urea aqueous solution (the high-low direction of the level of the urea aqueous solution) whose volume changes in the urea water tank is set as the direction of the axis O, and the leading end sides of the outer cylinder electrode 10 and the inner electrode 20 are set on the side where the volume of the urea aqueous solution is small (low level side). Further, the electrostatic capacity of the gap between the outer cylinder electrode 10 and the inner electrode 20 is measured, and detection is made of to what level the urea aqueous solution which is present between them is present in the direction of the axis O. As is known, this is based on the fact that the smaller the radial difference between two points having different radial potentials, the greater the magnitude of the electrostatic capacity.

Namely, in the portion which is not filled with the urea aqueous solution, the distance of the portion where a potential difference is produced in the gap becomes a total distance of a distance corresponding to the thickness of an air layer interposed between the inner peripheral surface of the outer cylinder electrode 10 and the insulating film 23 and a distance corresponding to the thickness of the insulating film 23. Meanwhile, in the portion which is filled with the urea aqueous solution, the distance of the portion where a potential difference is produced in the gap becomes the distance corresponding to the thickness of the insulating film 23 since the potentials at the outer cylinder electrode 10 and the urea aqueous solution become practically equal because the urea aqueous solution is electrically conductive.

In other words, it can be said that the electrostatic capacity of the gap at the portion which is not filled with the urea aqueous solution is a combined capacity of a capacitor in which the electrostatic capacity of a capacitor in which air is a dielectric (nonconductor) and a capacitor in which the insulating film 23 is the dielectric are connected in series. Also, it can be said that the electrostatic capacity of the gap at the portion which is filled with the urea aqueous solution is the electrostatic capacity of a capacitor in which the insulating film 23 is the dielectric. Then, the electrostatic capacity of the capacitor in which the both are connected in parallel is measured as the electrostatic capacity of the overall level detecting unit 70.

Here, since the distance between the electrodes sandwiching the air layer is configured to be larger than the distance between the electrodes sandwiching the insulating film 23, the electrostatic capacity per unit between the electrodes having the air as the dielectric is smaller than the electrostatic capacity per unit between the electrodes having the insulating film 23 as the dielectric. For this reason, the change in the electrostatic capacity of the portion which is filled with the urea aqueous solution is greater than the change in the electrostatic capacity of the portion which is not filled with the urea aqueous solution, and the electrostatic capacity of the overall capacitor consisting of the outer cylinder electrode 10 and the inner electrode 20 is proportional to the level of the urea aqueous solution.

In this embodiment, the measurement of the level of the urea aqueous solution is performed by the microcomputer 220 through the above-described level detecting circuit 250, and a level information signal thus obtained is outputted from the input/output circuit unit 290 to the unillustrated ECU. Then, on the basis of the inputted level information signal, the ECU determines whether or not the level (residual quantity) of the urea aqueous solution is proper and, if not proper, the ECU performs, as required, the processing of notifying the driver to that effect.

Next, a description will be given of the principle whereby the concentration of urea as a particular component contained in the urea aqueous solution is detected in the ceramic heater making up the liquid property detecting unit 30. It is known that the thermal conductivity of a liquid generally differs depending on the concentration of a particular component contained in the liquid. Namely, in a case where a heat generating resistor is used and the liquid surrounding it is heated for a fixed time duration, the rate of temperature rise differs in a liquid having a different concentration. In addition, it is also known that in a case where a constant electric current is passed through the heat generating resistor, the resistance value of the heat generating resistor increases in proportion to the rise of the ambient temperature of the heat generating resistor. Consequently, if the heat generating resistor is used and the liquid surrounding it is heated for a fixed time duration, if the degree of change of the resistance value of the heat generating resistor can be obtained, the degree of temperature change of the surrounding liquid can be obtained, so that it is possible to obtain the concentration of the liquid.

The liquid state detecting sensor 100 of this embodiment is configured so as to pass a constant electric current through the heat generating resistor pattern 114 for a fixed time duration, and a detection voltage Vd corresponding to the magnitude of its resistance value is produced across the both ends of the heat generating resistor pattern 114. It should be noted that the detection voltage Vd is measured by the differential amplifier circuit portion 230 as the difference between the potential Pin appearing at one end of the heat generating resistor pattern 114 and the potential Pout appearing at the other end thereof, as described above.

Specifically, first, upon instruction from the microcomputer 220, the switch 260 is closed to start passing a constant electric current through the heat generating resistor pattern 114. Then, the detection voltage Vd immediately after the start of energization of the heat generating resistor pattern 114 is obtained by the microcomputer 220 through the differential amplifier circuit portion 230, and the acquisition of the detection voltage Vd is effected again by the microcomputer 220 after a fixed time duration (e.g., 700 ms). Then, the calculation of the concentration of the urea aqueous solution is effected by the microcomputer 220 by using a table (not shown) prepared in advance by an experiment or the like and by using a differential value of the aforementioned two detection voltages Vd as a parameter. In addition, after the lapse of a fixed time duration, the switch 260 is opened on the basis of an instruction from the microcomputer to interrupt the energization of the heat generating resistor pattern 114. Then, a concentration information signal finally obtained by the microcomputer 220 is outputted from the input/output circuit unit 290 to the ECU. On the basis of the inputted concentration information signal, the ECU determines whether or not the concentration of the urea aqueous solution is within a proper range and, if not in the proper range, performs, as required, the processing of notifying the driver to that effect.

Incidentally, it goes without saying that various modifications are possible in the invention. For example, as in the case of a holder 350 of a liquid state detecting sensor 300 shown in FIG. 11, a seal ring 340 may be interposed between the inner periphery of a leading end portion 321 of an inner electrode 320 and a cylindrical portion 352 of the holder 350 which is inserted into that leading end portion 321, so as to ensure water-tightness of the interior of the inner electrode 320. In this case, at the leading end portion 321 of the inner electrode 320, an insulating film 323 is formed in such a manner as to be turned up from the outer peripheral side to the inner peripheral side of the inner electrode 320. Then, if the formation of the insulating film 323 is effected at least up to the position where the seal ring 340 is disposed on the inner peripheral side of the leading end portion 321 of the inner electrode 320, even if the level detecting unit 70 is immersed in the urea aqueous solution, the inner electrode 320 does not come into direct contact with the urea aqueous solution.

Figure 12:
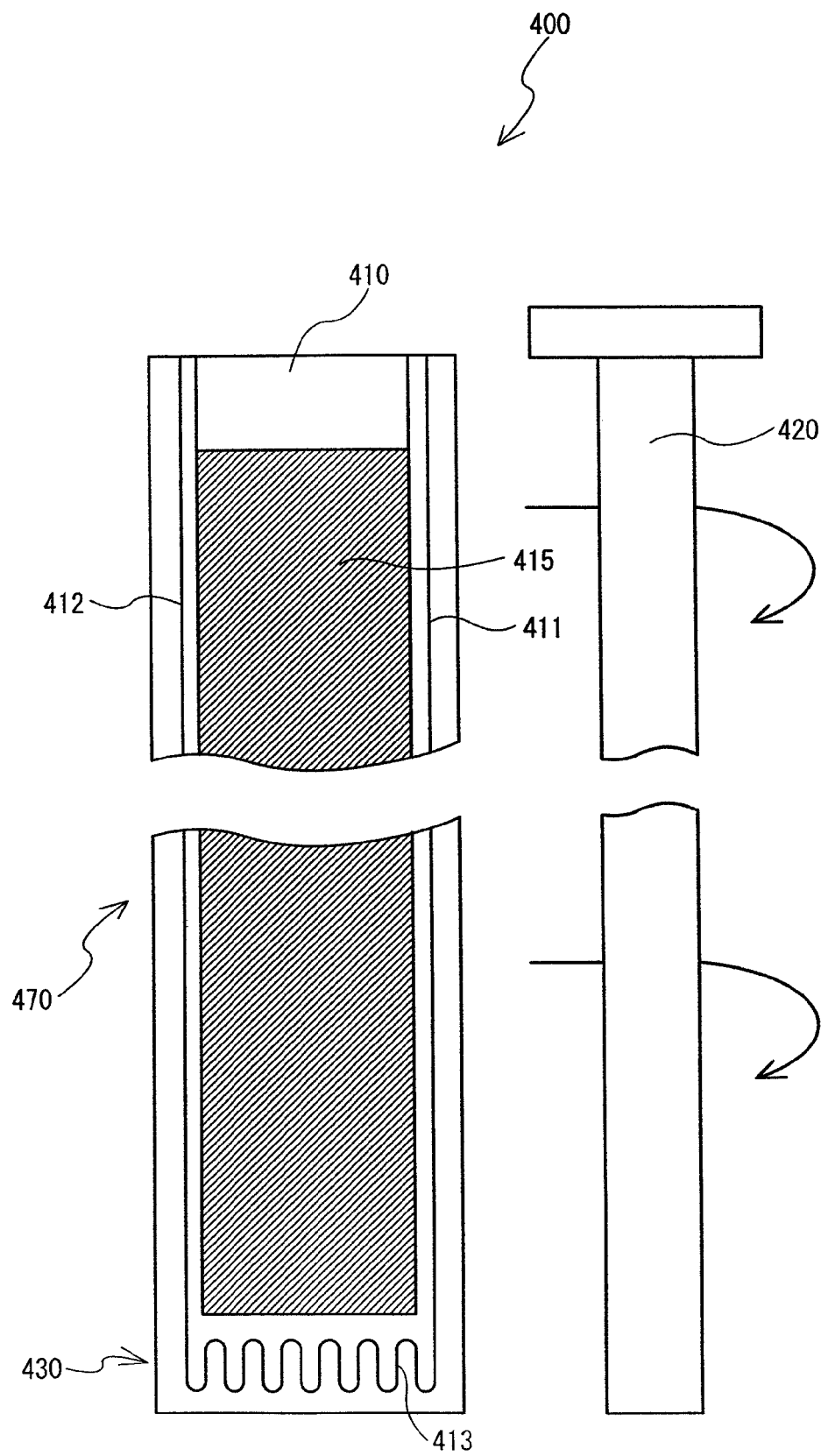
FIG. 12 is a diagram illustrating the configuration of an inner electrode 400 of the liquid state detecting sensor as the modification.

In addition, as shown in FIG. 12, an inner electrode 400 may be used in which one electrode of a level detecting unit 470 and a liquid property detecting unit 430 are formed on a same insulating ceramic sheet 410 as an electrode pattern, which is then wrapped around a solid or hollow rod-like supporting member 420. Such an inner electrode 400 may be fabricated as follows. The electrode pattern of an inner electrode 415 is formed with a wide area by leaving a portion for disposing the liquid property detecting unit 430 on one longitudinal end side of the rectangular insulating ceramic sheet 410. Then, electrode patterns for forming lead portions 411 and 412 of the liquid property detecting unit 430 are formed along the longitudinal direction of the insulating ceramic sheet 410 in such a manner as not to come into contact with the inner electrode 415. An electrode pattern for forming a heat generating resistor 413 for connecting the lead portions 411 and 412 is formed on the liquid property detecting unit 430. Then, the insulating ceramic sheet 410 with these electrode patterns formed thereon is wrapped around the supporting member 420.

Here, if the electrode patterns are embedded in the insulating ceramic sheet 410, the supporting member 420 may be a conductive metal rod. Meanwhile, if the supporting member 420 is insulative, the electrode patterns may not be embedded and may be wrapped around facing the supporting member 420 side. As the inner electrode 400 is baked in this state and is assembled inside the outer cylinder electrode 10 of this embodiment, the level detecting unit 470 can be formed between the outer cylinder electrode 10 and the inner electrode 415. Further, the liquid property detecting unit 430 is disposed by being connected to the leading end portion of this inner electrode 400 in a state of being insulated from the level detecting unit 470.

In addition, in this embodiment, although the same material is used for the heat generating resistor pattern 114 and the lead portions 112 and 113 of the ceramic heater 110 and the cross-sectional areas of the patterns are made different to allow heat generation to be effected mainly in the heat generating resistor pattern 114, their respective materials made be made different.

In addition, although in this embodiment the urea concentration in the urea aqueous solution is determined by reference to a table by using a voltage value corresponding to the resistance value of the heat generating resistor pattern 114 of the ceramic heater 110, the concentration of the urea aqueous solution may be calculated by setting the voltage value corresponding to the resistance value as a variable and by substituting it into a formula representing the aforementioned relationship determined in advance by an experiment or the like.

In addition, as the insulating film 23 formed on the inner electrode 20, it is preferable to select a corrosion-resistant material in correspondence with the properties of the liquid (e.g., acidity, reducibility, etc.). It should be noted that the formation of the insulating film is carried out by dipping or electrostatic powder coating, but if a setting is provided such that the entrapment of air with respect to the inner electrode is utterly nil, the formation of the insulating film may be carried out by using an insulating tube. Furthermore, although the outer cylinder electrode 10 and the inner electrode 20 is formed of metal, they may be formed by using an electrically conductive resin.

In addition, the grooves portions 84 and 88 of the rubber bushing 80 are provided in groove form on the inner peripheral side and the outer peripheral side of the rubber bushing 80, but may be formed as through holes penetrating thick-walled portions. Further, the rubber bushing 80 may be formed by eliminating any one or ones of the groove portions 84 and 88. Additionally, the outer cylinder electrode 10 and the inner electrode are provided with cylindrical shapes, but may be provided with rectangular tubular shapes.

Furthermore, the ceramic heater 110 serving as the liquid property detecting element suffices if it detects at least the concentration of a particular component (e.g., urea) contained in a liquid, and it may also be used for detecting the sensing of the temperature of a liquid or a lower limit level of a liquid other than the concentration detection.

For example, in a case where the temperature of a liquid is detected by the ceramic heater 110, it is possible to detect the temperature of the liquid on the basis of the magnitude of the resistance value of the heat generating resistor pattern 114 immediately after a constant electric current is started to flow through that heat generating resistor pattern 114 (more specifically, the magnitude of the detection voltage Vd generated across the both ends of the heat generating resistor pattern 114). Since the resistance value of the heat generating resistor pattern 114 immediately after the energization shows a value corresponding to the temperature of the liquid, the temperature of the liquid is detected through such a technique. In addition, since the behavior of the change of the resistance value of the heat generating resistor pattern 114 substantially varies between the case where the liquid is present around the ceramic heater 110 and the case where it is not, the detection of the lower limit level of the liquid may be carried out by making use of this difference.

Although the invention has been described in detail and with reference to a specific embodiment, it will be obvious to those skilled in the art that various changes and modifications may be made without departing from the spirit and scope of the invention.

This application is based on Japanese Patent Application filed on Jul. 1, 2005 (Japanese Patent Application No. 2005-193298), the contents of which are incorporated herein by reference.

INDUSTRIAL APPLICABILITY

The invention is applicable to a liquid state detecting sensor in which a sensor for effecting the level detection of a liquid and a sensor for effecting concentration detection are integrally connected together.

The invention claimed is:

1. A liquid state detecting sensor for detecting a state of a liquid accommodated in an accommodating container, comprising:
   a level detecting unit having a first electrode and a second electrode extending in a longitudinal direction and configured to form a capacitor whose electrostatic capacity changes between the first electrode and the second electrode in correspondence with a level of the liquid accommodated in the accommodating container;
   a mounting part located on a rear end side in the longitudinal direction of the level detecting unit and adapted to mount the liquid state detecting sensor in the accommodating container;
   a liquid property detecting element connected to the level detecting unit in an insulated state and adapted to detect at least a concentration of a particular component contained in the liquid, the liquid property detecting element having a leading end located closer to a leading end of the liquid state detecting sensor than a longitudinal leading end of the level detecting unit and having a heat generating resistor pattern whose resistance value changes in correspondence with a temperature of the heat generating resistor pattern, the heat generating resistor pattern being located closer to the leading end of the liquid state detecting sensor than the longitudinal leading end of the level detecting unit; and
   a detection circuit for detecting a concentration of the particular component contained in the liquid on the basis of a change of an electric property of the heat generating resistor pattern.

2. The liquid state detecting sensor according to claim 1, wherein the liquid is an electrically conductive liquid, and the liquid property detecting element has a configuration in which the heat generating resistor pattern is embedded in an insulating ceramic substrate, and an outer surface of the insulating ceramic substrate at a portion where the heat generating resistor pattern is disposed comes into contact with the liquid.

3. The liquid state detecting sensor according to claim 1, wherein the detection circuit energizes the heat generating resistor pattern for a fixed time duration, obtains a first corresponding value and a second corresponding value corresponding to resistance values of the heat generating resistor pattern at different timings within the fixed time duration, and detects a concentration of the particular component in the liquid on the basis of the first corresponding value and the second corresponding value.

4. The liquid state detecting sensor according to claim 1, wherein the first electrode is a tubular outer cylinder electrode formed of a conductor, and the second electrode is an inner electrode formed of a conductor and provided within the outer cylinder electrode along the longitudinal direction thereof.

5. The liquid state detecting sensor according to claim 4, wherein the inner electrode has a tubular shape, and a lead wire which is electrically connected to the liquid property detecting element is inserted in an inside of the inner electrode.

6. The liquid state detecting sensor according to claim 4, wherein the liquid property detecting element is held by an insulating holder which is fitted to a leading end portion of the inner electrode.

7. The liquid state detecting sensor according to claim 6, wherein the liquid is an electrically conductive liquid, and the holder is fitted on an outer side of the leading end portion of the inner electrode by means of a seal ring, and an insulating film is formed on a surface of the inner electrode in a range extending at least from a position where the seal ring is disposed on the inner electrode to an outer side of a rear end portion of the inner electrode.

8. The liquid state detecting sensor according to claim 6, wherein the liquid is an electrically conductive liquid, the inner electrode has a tubular shape, the holder is fitted on an inner side of the leading end portion of the inner electrode by means of a seal ring, and an insulating film is formed on a surface of the inner electrode in a range extending at least from a position where the seal ring is disposed on the inner electrode to an outer side of a rear end portion of the inner electrode.

9. The liquid state detecting sensor according to claim 4, wherein one or a plurality of slits are formed on at least one generating line of an outer peripheral surface of the outer cylinder electrode.

10. The liquid state detecting sensor according to claim 4, further comprising: a rubber-made supporting member interposed between an outer side of the inner electrode and an inner side of the outer cylinder electrode, wherein the inner electrode is resiliently supported on an inner side of the outer cylinder electrode by the supporting member.

11. The liquid state detecting sensor according to claim 10, wherein the liquid property detecting element is held by the insulating holder fitted to a leading end portion of the inner electrode, and the supporting member supports the holder so as not to move toward a leading end side.

12. The liquid state detecting sensor according to claim 10, wherein a circulation passage for allowing the liquid which is present on a leading end side of the supporting member and the liquid which is present on a rear end side of the supporting member to circulate is formed on the supporting member.

13. The liquid state detecting sensor according to claim 12, wherein the circulation passage is provided by grooving an outer lateral surface of the supporting member.

14. The liquid state detecting sensor according to claim 12, wherein the circulation passage is provided by grooving an inner lateral surface of the supporting member.

15. The liquid state detecting sensor according to claim 4, wherein a leading end portion of the outer cylinder electrode surrounds the liquid property detecting element peripherally in a radial direction.

16. The liquid state detecting sensor according to claim 1, further comprising: a surrounding member in which a liquid circulation hole for circulation of the liquid is formed and which surrounds a periphery of the liquid property detecting element, wherein
the surrounding member is connected to the level detecting unit in an insulated state.

17. The liquid state detecting sensor according to claim 15, further comprising: a surrounding member in which a liquid circulation hole for circulation of the liquid is formed and which surrounds a periphery of the liquid property detecting element, wherein
the surrounding member is connected to the level detecting in an insulated state, and
a leading end of the outer cylinder electrode is located closer to a leading end of the liquid state detecting sensor than a leading end of the surrounding member.

18. The liquid state detecting sensor according to claim 1, wherein the liquid is a urea aqueous solution, and the particular component is urea.

* * * * *